United States Patent
Joshi et al.

(10) Patent No.: US 10,645,381 B2
(45) Date of Patent: May 5, 2020

(54) INTRA-PREDICTION FOR SMOOTH BLOCKS IN IMAGE/VIDEO

(71) Applicant: GOOGLE LLC, Mountain View, CA (US)

(72) Inventors: Urvang Joshi, Mountain View, CA (US); Debargha Mukherjee, Cupertino, CA (US)

(73) Assignee: GOOGLE LLC, Mountain View, CA (US)

(*) Notice: Subject to any disclaimer, the term of this patent is extended or adjusted under 35 U.S.C. 154(b) by 115 days.

(21) Appl. No.: 15/966,005

(22) Filed: Apr. 30, 2018

(65) Prior Publication Data

US 2019/0335199 A1    Oct. 31, 2019

(51) Int. Cl.
*H04N 19/11*       (2014.01)
*H04N 19/593*      (2014.01)
*H04N 19/176*      (2014.01)
*H04N 19/61*       (2014.01)
*H04N 19/59*       (2014.01)

(52) U.S. Cl.
CPC .......... *H04N 19/11* (2014.11); *H04N 19/176* (2014.11); *H04N 19/593* (2014.11); *H04N 19/61* (2014.11); *H04N 19/59* (2014.11)

(58) Field of Classification Search
CPC ..... H04N 19/593; H04N 19/176; H04N 19/11
See application file for complete search history.

(56) References Cited

U.S. PATENT DOCUMENTS

| | | | |
|---|---|---|---|
| 6,157,676 A * | 12/2000 | Takaoka ............... | H04N 19/593 375/240.13 |
| 6,282,322 B1 * | 8/2001 | Rackett ................ | H04N 19/105 375/240.24 |
| 6,680,974 B1 | 1/2004 | Faryar et al. | |
| 7,289,674 B2 | 10/2007 | Karczewicz | |

(Continued)

FOREIGN PATENT DOCUMENTS

| | | | | |
|---|---|---|---|---|
| GB | 2205704 A * | 12/1988 | ........... | H04N 19/593 |
| WO | WO-2018212582 A1 * | 11/2018 | ............. | H04N 19/11 |

OTHER PUBLICATIONS

U. Joshi, D. Mukherjee, J. Han, Y. Chen, S. Parker, H. Su, A. Chang, Y. Xu, Z. Liu, Y. Wang, J. Bankoski, C. Wang, and E. Keyder, "Novel inter and intra prediction tools under consideration for the emerging AV1 video codec", 10396 Proc. SPIE F1-F13 (Sep. 19, 2017) (Year: 2017).*

(Continued)

*Primary Examiner* — David N Werner
(74) *Attorney, Agent, or Firm* — Young Basile Hanlon & MacFarlane, P.C.

(57) ABSTRACT

Coding a block of a video frame using an intra-prediction mode is disclosed. A method includes selecting first neighboring pixels, generating second pixels for use along a second edge that is opposite the first edge of the block, and generating a prediction block that includes predicted pixels. The first neighboring pixels are peripheral to the block along a first edge of the block. The second pixels are generated using third neighboring pixels that are peripheral to a third edge of the block. The third edge is different from the first edge and the second edge. Generating the prediction block includes interpolating, using a first interpolation, the first neighboring pixels and the second pixels to obtain the predicted pixels.

17 Claims, 12 Drawing Sheets

(56) References Cited

U.S. PATENT DOCUMENTS

| | | | |
|---|---|---|---|
| 7,496,143 | B2 | 2/2009 | Schwarz et al. |
| 7,660,475 | B2 | 2/2010 | Bossen |
| 7,778,472 | B2 | 8/2010 | Ye et al. |
| 7,800,520 | B2 | 9/2010 | Lin et al. |
| 7,920,750 | B2 | 4/2011 | Bossen |
| 8,121,418 | B2 | 2/2012 | Ye et al. |
| 8,315,304 | B2 | 11/2012 | Lee et al. |
| 8,422,808 | B2 | 4/2013 | Adachi et al. |
| 8,422,809 | B2 | 4/2013 | Adachi et al. |
| 8,520,727 | B2 | 8/2013 | Takamura et al. |
| 8,913,662 | B2 | 12/2014 | Karczewicz et al. |
| 9,001,890 | B2 | 4/2015 | Song |
| 9,025,661 | B2 | 5/2015 | Karczewicz et al. |
| 9,106,913 | B2 | 8/2015 | Sole Rojals et al. |
| 9,191,670 | B2 | 11/2015 | Karczewicz et al. |
| 9,253,508 | B2 | 2/2016 | Gao et al. |
| 9,294,769 | B2 * | 3/2016 | Jeon ............... H04N 19/61 |
| 9,338,449 | B2 | 5/2016 | Sole Rojals et al. |
| 9,497,472 | B2 | 11/2016 | Coban et al. |
| 9,538,175 | B2 | 1/2017 | Karczewicz et al. |
| 9,544,584 | B2 | 1/2017 | Lim et al. |
| 9,544,597 | B1 * | 1/2017 | Han ............... H04N 19/176 |
| 9,596,464 | B2 | 3/2017 | Song et al. |
| 9,661,338 | B2 | 5/2017 | Karczewicz et al. |
| 9,693,054 | B2 | 6/2017 | Jeon et al. |
| 2010/0220790 | A1 * | 9/2010 | Jeon ............... H04N 19/182 |
| | | | 375/240.16 |
| 2011/0026583 | A1 | 2/2011 | Endresen |
| 2011/0293001 | A1 * | 12/2011 | Lim ............... G06K 9/36 |
| | | | 375/240.12 |
| 2013/0003857 | A1 | 1/2013 | Yu et al. |
| 2013/0034158 | A1 * | 2/2013 | Kirchhoffer ....... H04N 19/159 |
| | | | 375/240.12 |
| 2013/0101036 | A1 * | 4/2013 | Zhou ............... H04N 19/176 |
| | | | 375/240.12 |
| 2013/0301730 | A1 * | 11/2013 | Lin ............... H04N 19/176 |
| | | | 375/240.16 |
| 2013/0329794 | A1 * | 12/2013 | Jeon ............... H04N 19/61 |
| | | | 375/240.12 |
| 2013/0336386 | A1 | 12/2013 | Chong et al. |
| 2014/0307801 | A1 | 10/2014 | Ikai et al. |
| 2015/0078432 | A1 | 3/2015 | Wang et al. |
| 2015/0110173 | A1 * | 4/2015 | Bultje ............... H04N 19/129 |
| | | | 375/240.03 |
| 2015/0110409 | A1 * | 4/2015 | Bultje ............... H04N 19/13 |
| | | | 382/239 |
| 2015/0146781 | A1 * | 5/2015 | Kwon ............... H04N 19/50 |
| | | | 375/240.12 |
| 2015/0358621 | A1 | 12/2015 | He et al. |
| 2016/0373741 | A1 | 12/2016 | Zhao et al. |
| 2016/0373743 | A1 * | 12/2016 | Zhao ............... H04N 19/11 |
| 2016/0373770 | A1 * | 12/2016 | Zhao ............... H04N 19/124 |
| 2017/0353719 | A1 * | 12/2017 | Liu ............... H04N 19/147 |
| 2018/0176596 | A1 * | 6/2018 | Jeong ............... H04N 19/176 |
| 2018/0184083 | A1 * | 6/2018 | Panusopone ....... H04N 19/82 |
| 2018/0184110 | A1 * | 6/2018 | Panusopone ....... H04N 19/136 |
| 2018/0199062 | A1 * | 7/2018 | Zhang ............... H04N 19/42 |
| 2018/0213224 | A1 * | 7/2018 | Son ............... H04N 19/11 |
| 2018/0302629 | A1 * | 10/2018 | Kondo ............... H04N 19/593 |
| 2019/0124339 | A1 * | 4/2019 | Young ............... H04N 19/159 |
| 2019/0124340 | A1 * | 4/2019 | Young ............... H04N 19/124 |
| 2019/0238838 | A1 * | 8/2019 | Filippov ............. H04N 19/11 |
| 2019/0273926 | A1 * | 9/2019 | Heo ............... H04N 19/159 |

OTHER PUBLICATIONS

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

Valin, Jean-Marc; "Probability Modeling of Intra Prediction Modes"; Jul. 6, 2015; pp. 1-3.

Jingning Han et al., "A level-map approach to transform coefficient coding", 2017 IEEE International Conference on Image Processing (ICIP), IEEE, Sep. 17, 2017, pp. 3245-3249.

J. Chen et al., "Algorithm description of Joint Exploration Test Model 7 (JEM7)", Joint Video Exploration Team (JVET) of ITU-T SG 16 WP 3 and ISO/IEC JTC1/SC29/WG11, 7th Meeting, Torino, Italy, Jul. 13-21, 2017 (url: http://phenix.int-evry.fr/jvet/, document No. JVET-G1001 (Aug. 19, 2017), 48 pgs.

Jing Wang et al., "Transform Coefficient Coding Design for AVS2 Video Coding Standard", 2013 Visual Communications and Image Processing (VCIP), IEEE, Nov. 17, 2013), 6 pgs.

Tung Nguyen et al., "Transform Coding Techniques in HEVC", IEEE Journal of Selected Topics in Signal Processing, vol. 7, No. 6 (Dec. 1, 2013), pp. 978-989.

* cited by examiner

FIG. 8

INTRA-PREDICTION FOR SMOOTH BLOCKS IN IMAGE/VIDEO

BACKGROUND

Digital video streams may represent video using a sequence of frames or still images. Digital video can be used for various applications, including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

SUMMARY

One aspect of the disclosed implementations is a method for coding a block of a video frame using an intra-prediction mode. The method includes selecting first neighboring pixels, generating second pixels for use along a second edge that is opposite the first edge of the block, and generating a prediction block that includes predicted pixels. The first neighboring pixels are peripheral to the block along a first edge of the block. The second pixels are generated using third neighboring pixels that are peripheral to a third edge of the block. The third edge is different from the first edge and the second edge. Generating the prediction block includes interpolating, using a first interpolation, the first neighboring pixels and the second pixels to obtain the predicted pixels.

Another aspect is an apparatus for encoding a block of a video frame using an intra-prediction mode that includes a memory and a processor. The processor is configured to execute instructions stored in the memory to select first neighboring pixels, generate second pixels for use along a second edge that is opposite the first edge of the block, generate a prediction block that includes predicted pixels, generate a residual block using the prediction block and the block of video, and encode the residual block in a compressed bitstream. The first neighboring pixels are peripheral to the block along a first edge of the block. The second pixels are generated using third neighboring pixels, which are peripheral to a third edge of the block. The third edge is different from the first edge and the second edge. The prediction block is generated by interpolating, using an interpolation, the first neighboring pixels and the second pixels to obtain the predicted pixels.

Another aspect is an apparatus for decoding a block of a video frame using an intra-prediction mode that includes a memory and a processor. The processor is configured to execute instructions stored in the memory to select first neighboring pixels, the first neighboring pixels being peripheral to the block along a first edge of the block; generate second pixels for use along a second edge that is opposite the first edge of the block, the second pixels generated using third neighboring pixels, the third neighboring pixels being peripheral to a third edge of the block, and the third edge being different from the first edge and the second edge; generate a prediction block comprising predicted pixels by instructions to interpolate, using an interpolation, the first neighboring pixels and the second pixels to obtain the predicted pixels; decode, from a compressed bitstream, a residual block; and reconstruct the block using the residual block and the prediction block.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

FIG. 8 is an example of weights used for a quadratic interpolation according to implementations of this disclosure.

DETAILED DESCRIPTION

Figure 1:
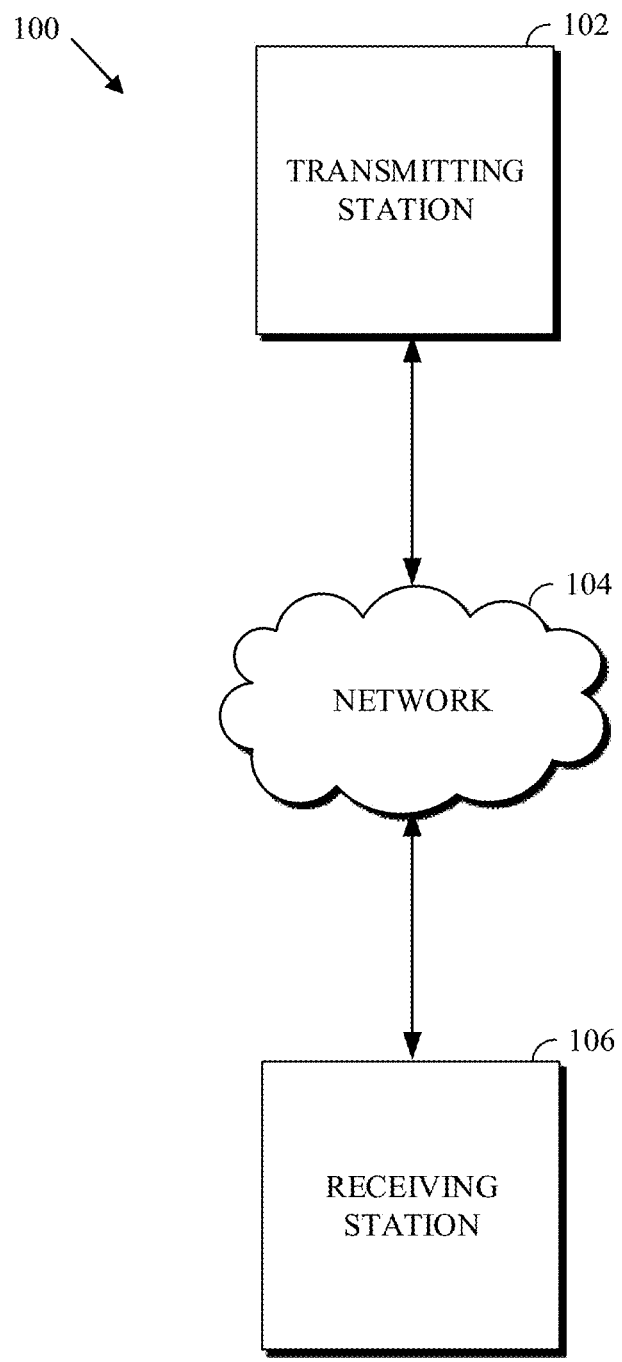
FIG. 1 is a schematic of a video encoding and decoding system.

As mentioned above, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities is referred to as intra-prediction. Intra-prediction techniques exploit spatial redundancy within a video frame for compression. Specifically, an image block (e.g., a block of a still image or a block of a frame of a video) can be predicted using neighboring coded pixels. An image block being coded is referred to as a current block. The neighboring pixels are typically pixels of reconstructed blocks of previously coded blocks. The previously coded blocks are blocks that precede the current block in a scan order of blocks of the image. For example, in a raster scan order, the reconstructed blocks are located on the top boundary and the left boundary, but outside, of the current block.

Intra-prediction attempts to predict the pixel values of the current block of a frame of video using pixels peripheral to the block; that is, using pixels that are in the same frame as the block but that are outside the block. A codec typically includes (e.g., implements) several intra-prediction modes. An intra-prediction mode may be selected by the encoder as part of a rate distortion loop. In brief, various intra-prediction modes may be tested to determine which type of prediction will have the lowest distortion for a given rate, or number of bits to be transmitted in an encoded video bitstream, including overhead bits included in the bitstream to indicate the type of prediction used. As further described below with respect to FIGS. 6A-6B and FIG. 7, intra-prediction modes can be directional or non-directional.

Implementations according to this disclosure can use one or more intra-prediction modes that are useful for predicting blocks that have smooth gradients. A smooth gradient refers to the gradual and continuous change in the intensity or color in the current block. The gradient can be in the horizontal direction, the vertical direction, or both.

Implementations according to this disclosure use different intra-prediction modes depending on the gradient direction. For example, a first intra-prediction mode (referred to herein as the "SMOOTH_H_PRED" mode) may be selected by a codec when the gradient of the current block is primarily or substantially horizontal; a second intra-prediction mode (referred to herein as the "SMOOTH_V_PRED" mode) may be selected by the codec when the gradient of the current block is primarily or substantially vertical; and a third intra-prediction mode (referred to herein as the "SMOOTH_PRED" mode) may be selected by a codec when the gradient of the current block is primarily or substantially in both the vertical and the horizontal directions. Implementations of this disclosure can result in higher compression ratios for blocks that have smooth gradients.

Intra-prediction for smooth image and/or video blocks is described herein first with reference to a system in which the teachings may be incorporated.

FIG. 1 is a schematic of a video encoding and decoding system 100. A transmitting station 102 can be, for example, a computer having an internal configuration of hardware, such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
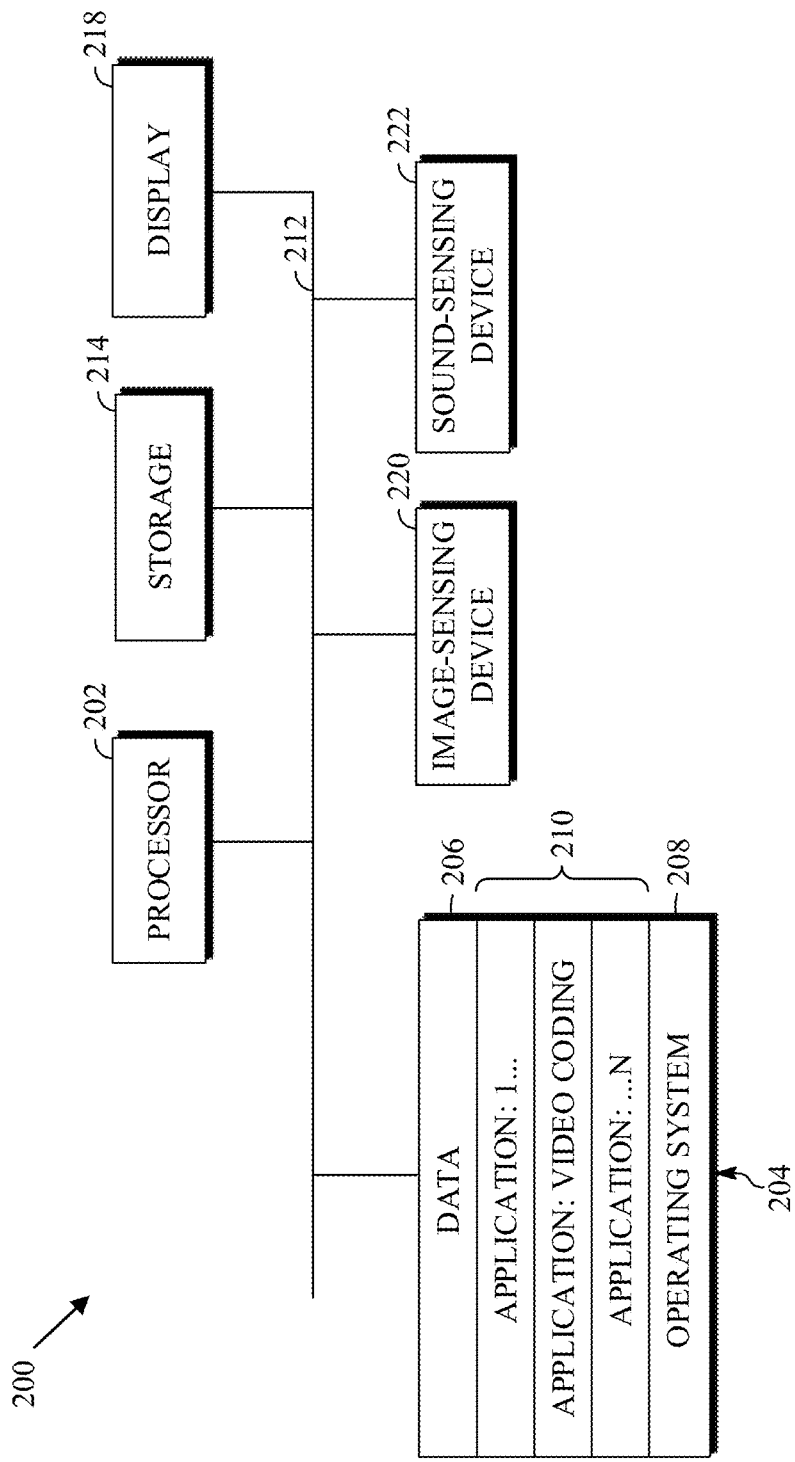
FIG. 2 is a block diagram of an example of a computing device that can implement a transmitting station or a receiving station.

The receiving station 106, in one example, can be a computer having an internal configuration of hardware, such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP (e.g., an HTTP-based video streaming protocol) may be used.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, now-existing or hereafter developed, capable of manipulating or processing information. Although the disclosed implementations can be practiced with a single processor as shown, for example, the CPU 202, advantages in speed and efficiency can be achieved by using more than one processor.

In an implementation, a memory 204 in the computing device 200 can be a read-only memory (ROM) device or a random-access memory (RAM) device. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described herein. For example, the application programs 210 can include applications 1 through N, which further include a video coding application that performs the methods described herein. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD); a cathode-ray tube (CRT) display; or a light emitting diode (LED) display, such as an organic LED (OLED) display.

The computing device 200 can also include or be in communication with an image-sensing device 220, for example, a camera, or any other image-sensing device, now existing or hereafter developed, that can sense an image, such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device, now existing or hereafter developed, that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines, such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit, such as a memory card, or multiple units, such as multiple memory cards. The computing device 200 can thus be implemented in a wide variety of configurations.

Figure 3:
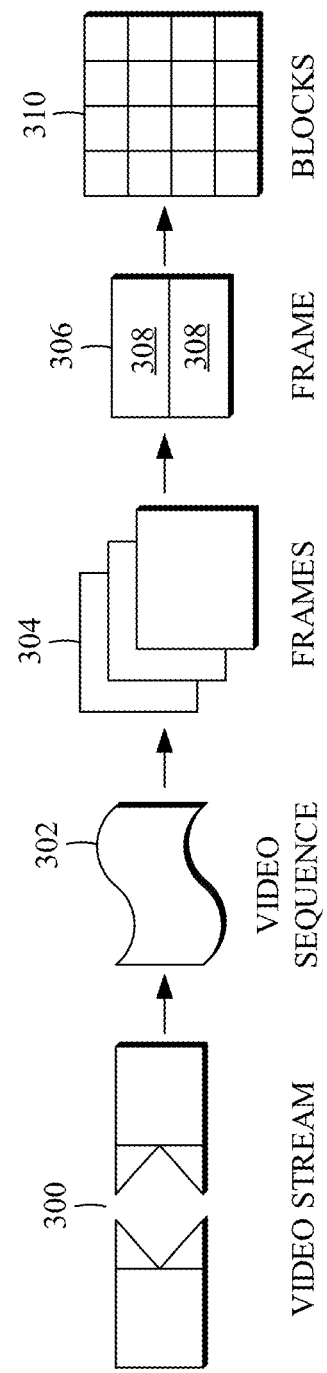
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size, such as 4×4 pixels, 8×8 pixels, 16×8 pixels, 8×16 pixels, 16×16 pixels or larger.

Figure 4:
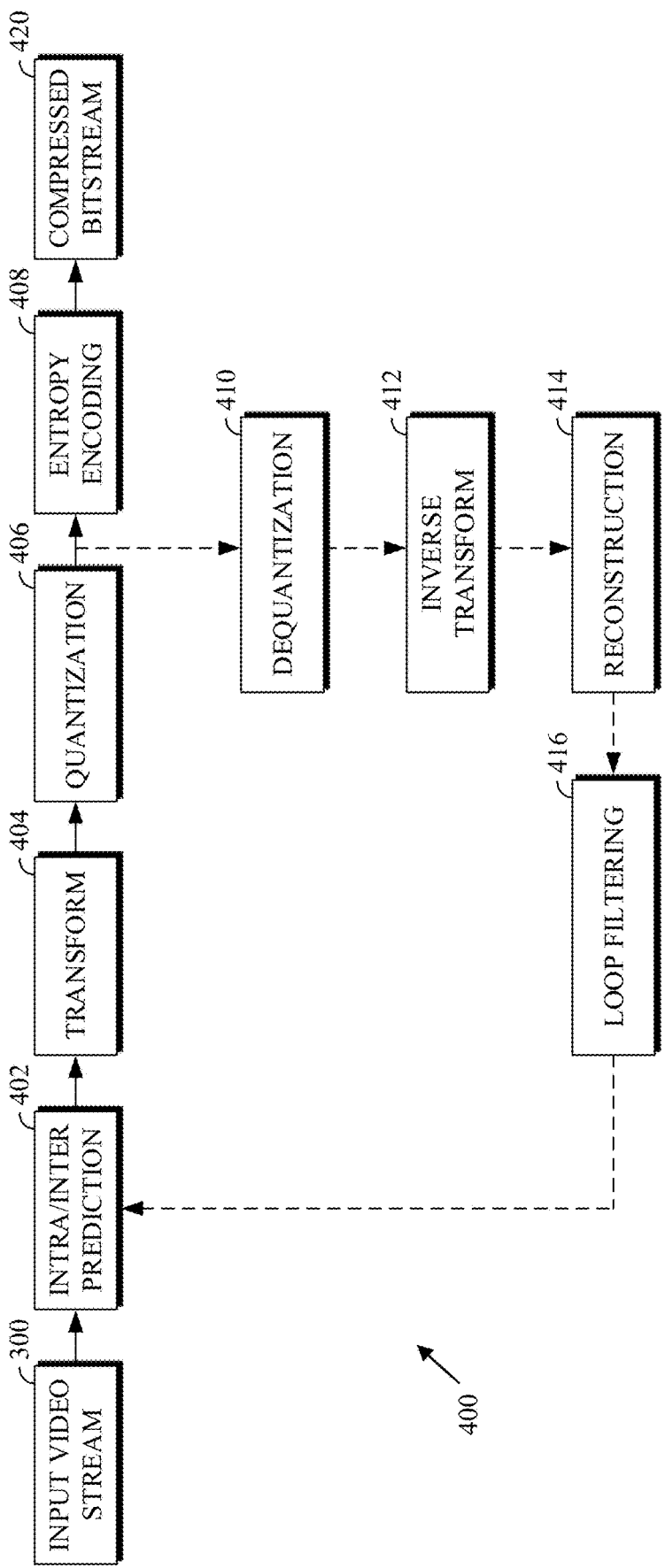
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102, such as by providing a computer software program stored in memory, for example, the memory 204. The computer software program can include machine instructions that, when executed by a processor, such as the CPU 202, cause the transmitting station 102 to encode video data in manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter-prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter-prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter-prediction stage 402 to produce a residual block (also called a residual). The transform stage 404 transforms the residual into transform coefficients in, for example, the frequency domain using block-based transforms. Such block-based transforms (i.e., transform types) include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient is at the top-left of the matrix, and the highest frequency coefficient is at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block (which may include, for example, the type of prediction used, transform type, motion vectors, and quantizer value), are then output to the compressed bitstream 420. The information to decode the block may be entropy coded into block, frame, slice, and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter-prediction stage 402 can be added to the derivative residual to create a reconstructed block. The loop filtering stage 416 can be applied to the reconstructed block to reduce distortion, such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
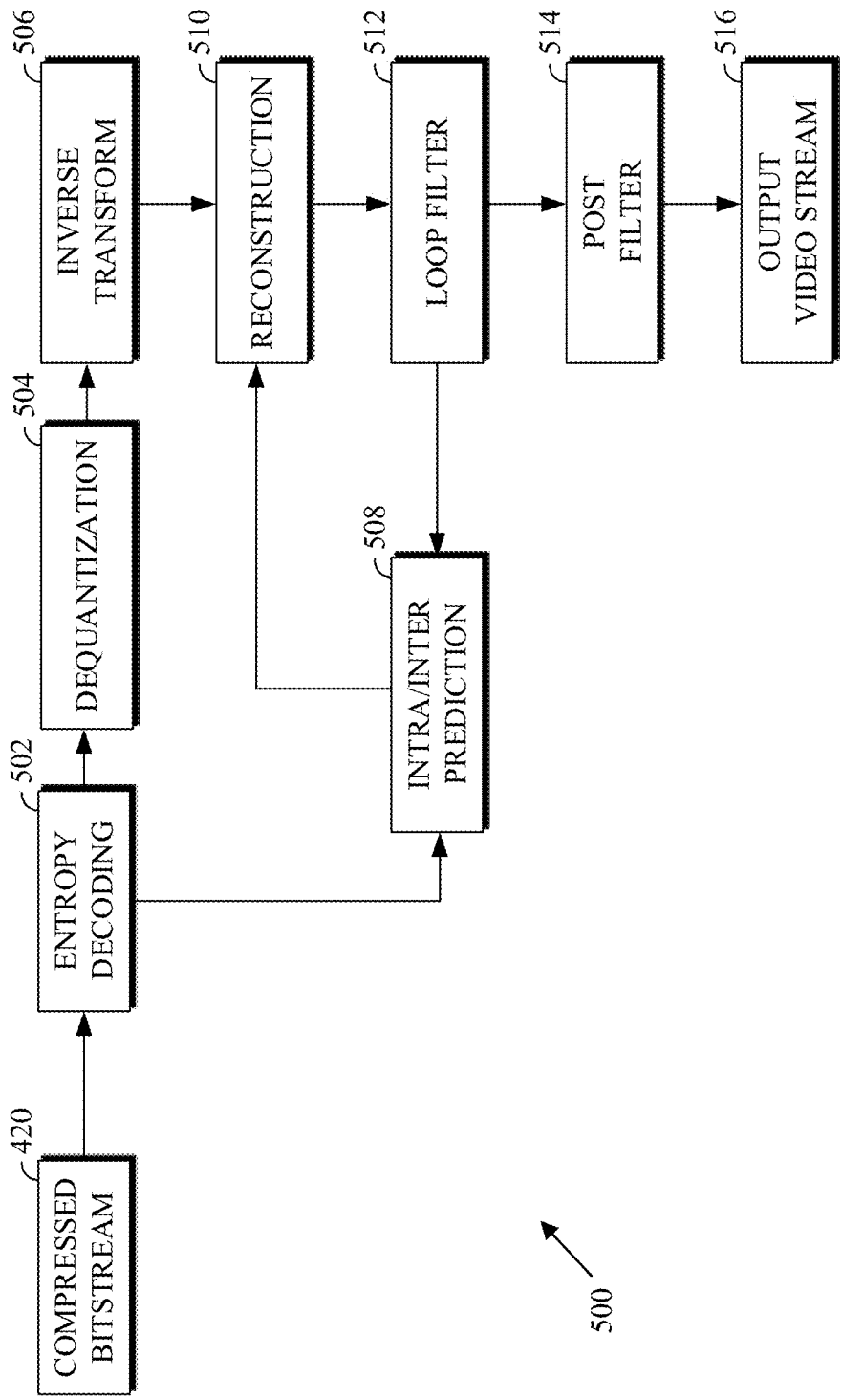
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor, such as the CPU 202, cause the receiving station 106 to decode video data in the manners described below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512, and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, for example, at the intra/inter-prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied after the loop filtering stage 512. The loop filtering stage 512 can include an optional deblocking filtering stage. Additionally, or alternatively, the encoder 400 includes an optional deblocking filtering stage in the loop filtering stage 416.

A codec can use multiple transform types. For example, a transform type can be the transform type used by the transform stage 404 of FIG. 4 to generate the transform block. For example, the transform type (i.e., an inverse transform type) can be the transform type to be used by the dequantization stage 504 of FIG. 5. Available transform types can include a one-dimensional Discrete Cosine Transform (1D DCT) or its approximation, a one-dimensional Discrete Sine Transform (1D DST) or its approximation, a two-dimensional DCT (2D DCT) or its approximation, a two-dimensional DST (2D DST) or its approximation, and an identity transform. Other transform types can be available. In an example, a one-dimensional transform (1D DCT or 1D DST) can be applied in one dimension (e.g., row or column) and the identity transform applied in the other dimension.

In the cases where a 1D transform (e.g., 1D DCT, 1D DST) is used (e.g., 1D DCT is applied to columns (or rows, respectively) of a transform block), the quantized coefficients can be coded by using a row-by-row (i.e., raster) scanning order or a column-by-column scanning order. In the cases where 2D transforms (e.g., 2D DCT) are used, a different scanning order may be used to code the quantized coefficients. As indicated above, different templates can be used to derive contexts for coding the non-zero flags of the non-zero map based on the types of transforms used. As such, in an implementation, the template can be selected based on the transform type used to generate the transform block. As indicated above, examples of a transform type include: 1D DCT applied to rows (or columns) and an identity transform applied to columns (or rows); 1D DST applied to rows (or columns) and an identity transform applied to columns (or rows); 1D DCT applied to rows (or columns) and 1D DST applied to columns (or rows); a 2D DCT; and a 2D DST. Other combinations of transforms can comprise a transform type.

As mentioned above, a current block can be predicted using intra-prediction. An intra-prediction mode uses pixels peripheral to the current block being predicted. Pixels peripheral to the current block are pixels outside the current block. Many different intra-prediction modes can be available. Some intra-prediction modes, which may be referred to as directional intra-prediction modes, can have a corresponding prediction angle. Other intra-prediction modes are non-directional. Other types of intra-prediction modes can also be available.

In an example, the following 13 intra-prediction modes can be available: DC_PRED, V_PRED, H_PRED, D45_PRED, D135_PRED, D117_PRED, D153_PRED, D207_PRED, D63_PRED, SMOOTH_PRED, SMOOTH_V_PRED, SMOOTH_H_PRED, and PAETH_PRED.

Figure 6A:
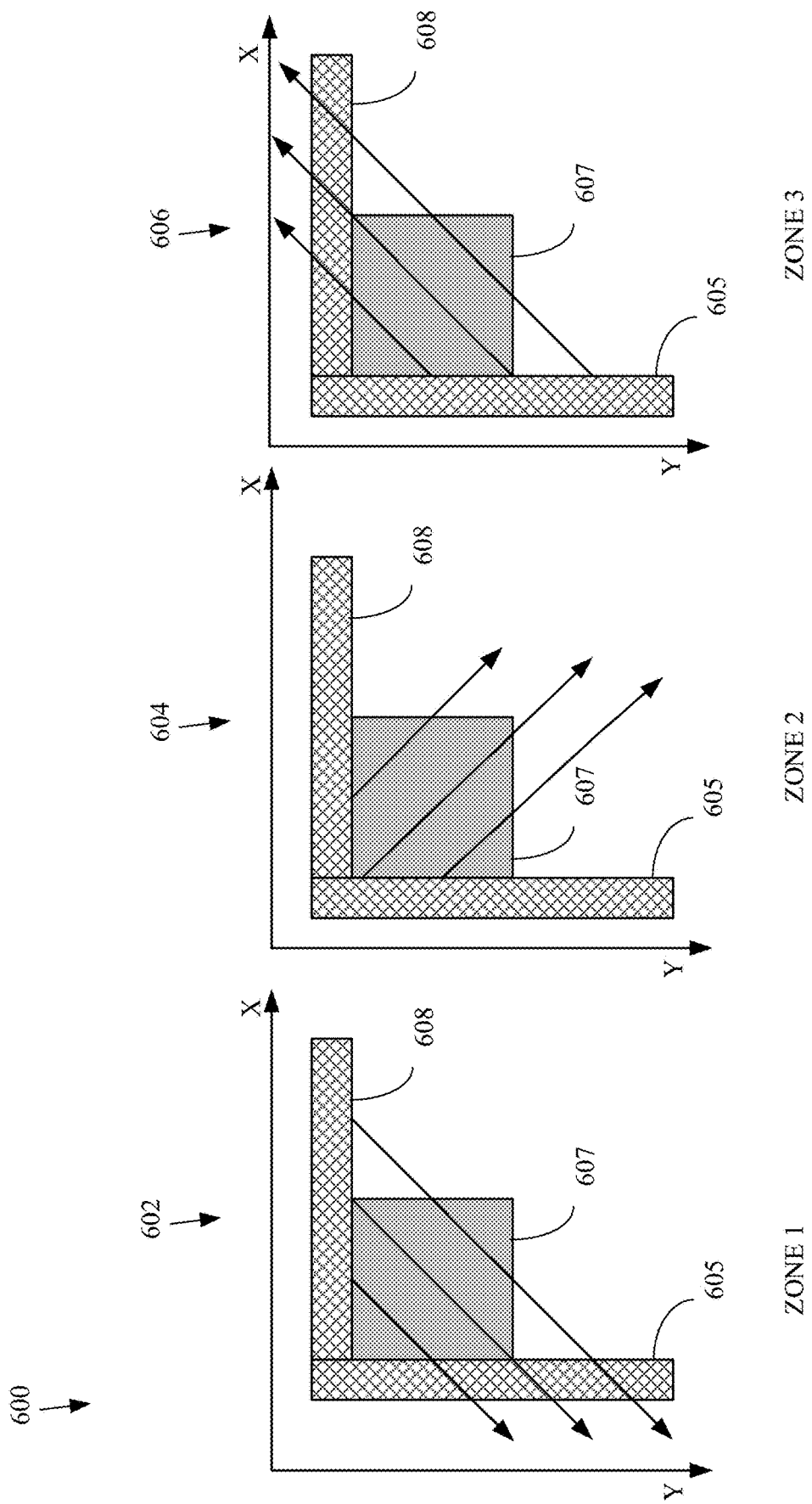
FIG. 6A is a diagram of directional intra-prediction modes according to implementations of this disclosure.

FIG. 6A is a diagram 600 of directional intra-prediction modes according to implementations of this disclosure. FIG. 6A illustrates grouping directional intra-prediction modes into three zones, namely, zones 602, 604, and 606, labeled Zone 1, Zone 2, and Zone 3, respectively. An intra-prediction mode of one of the zones 602, 604, 606 can be used to generate a prediction block 607 having dimensions conforming to a current block. The zone 602 is characterized by intra-prediction modes having prediction angles greater than 0 and less than or equal to 90 degrees (i.e., (0, 90] degrees). As such, a prediction mode having an angle in Zone 1 may be referred to as a north-east intra-prediction mode. The zone 604 is characterized by intra-prediction modes having prediction angles greater than 90 and less than or equal to 180 degrees (i.e., (90, 180] degrees). As such, a prediction mode having an angle in Zone 2 may be referred to as a north-west intra-prediction mode. The zone 606 is characterized by intra-prediction modes having prediction angles between 180 and 270 degrees (i.e., (180, 270) degrees). As such, a prediction mode having an angle in Zone 3 may be referred to as a south-west intra-prediction mode. Collectively, prediction modes of zones 604-606 can be referred to as directional intra-prediction modes. As such, the prediction modes V_PRED, H_PRED, D45_PRED, D135_PRED, D117_PRED, D153_PRED, D207_PRED, and D63_PRED are directional intra-prediction modes.

FIG. 6A also illustrates first pixels 608 in a row above the current block and second pixels 605 in a column to the left of the current block. The first pixels 608 and second pixels 605 can be used to generate the prediction block. In some implementations, directional intra-prediction modes in Zone 1 (i.e., intra-prediction modes having prediction angles between 0 and 90 degrees) use the first pixels 608 but may not use the second pixels 605 to generate the prediction block; directional predictions in Zone 2 (i.e., intra-prediction modes having prediction angles between 90 and 180 degrees) use the first pixels 608 and the second pixels 605 to generate the prediction block; and directional predictions in Zone 3 (i.e., intra-prediction modes having prediction angles between 180 and 270 degrees) use the second pixels 605 but may not use the first pixels 608 to generate the prediction block.

Figure 6B:
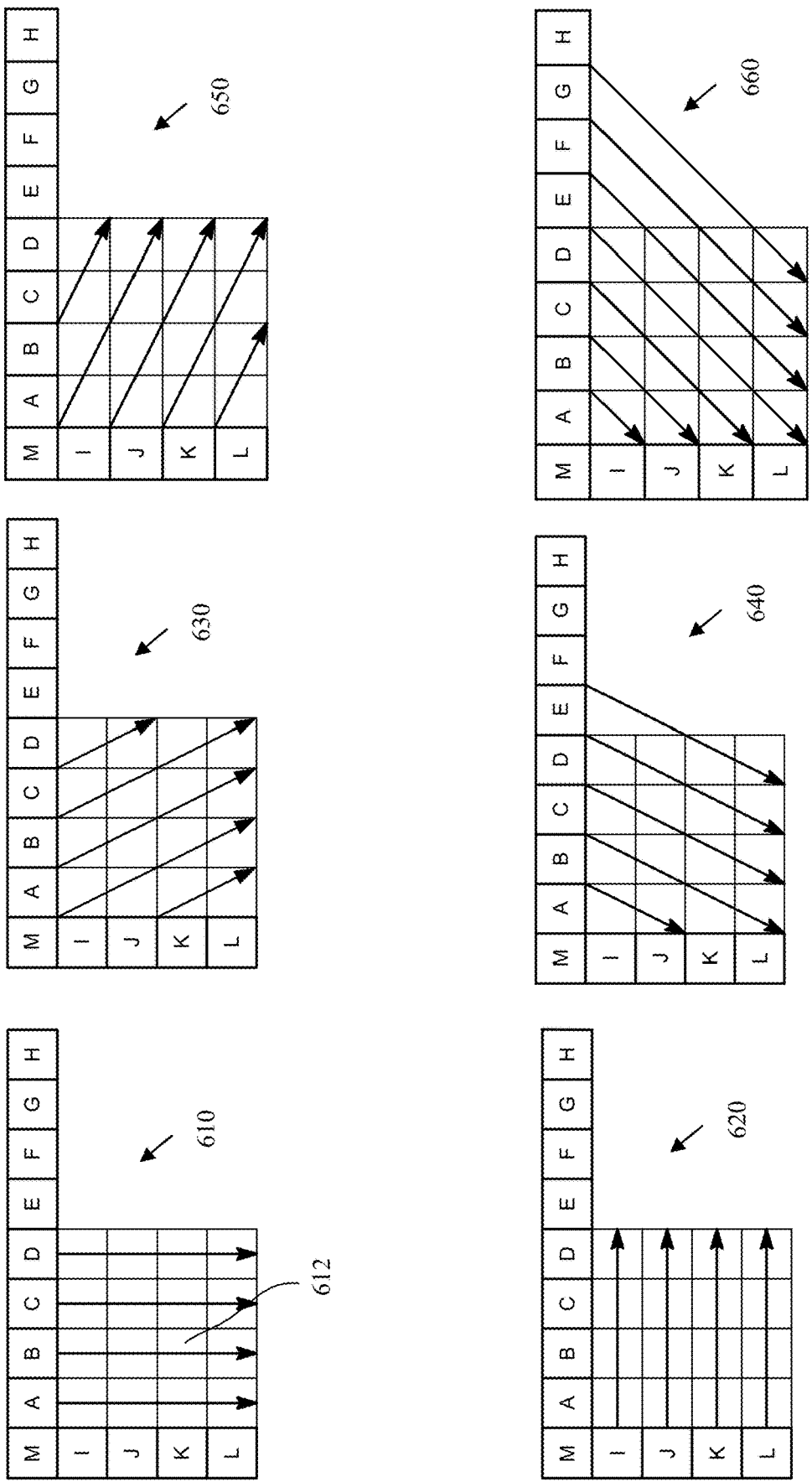
FIG. 6B is a diagram of examples of intra-prediction modes according to implementations of this disclosure.

FIG. 6B is a diagram of examples of intra-prediction modes according to implementations of this disclosure. In the examples of FIG. 6B, the pixels A-M can be, or can be a subset of, the first pixels 608 of FIG. 6A; the pixels I-M can be, or can be a subset of, the second pixels 605 of FIG. 6A.

An intra-prediction mode 610 illustrates the V_PRED intra-prediction mode, which is referred to generally as a vertical intra-prediction mode. In this mode, prediction block pixels in the first column are set to the value of peripheral pixel A; prediction block pixels in the second column are set to the value of pixel B; prediction block pixels in the third column are set to the value of pixel C; and prediction block pixels in the fourth column are set to the value of pixel D.

An intra-prediction mode 620 illustrates the H_PRED intra-prediction mode, which is referred to generally as a horizontal intra-prediction mode. In this mode, prediction block pixels in the first row are set to the value of peripheral pixel I; prediction block pixels in the second row are set to the value of pixel J; prediction block pixels in the third row are set to the value of pixel K; and prediction block pixels in the fourth row are set to the value of pixel L.

An intra-prediction mode 630 illustrates the D117_PRED intra-prediction mode, so called because the direction of the arrows, along which the peripheral pixels will be propagated to generate the prediction block form a diagonal, is at an angle of about 117° from the horizontal. That is, in the D117_PRED, the prediction angle is 117°. The intra-prediction mode 630 is a Zone 2 (i.e., a north-west) intra-prediction mode.

An intra-prediction mode 640 illustrates the D63_PRED intra-prediction mode, which corresponds to a prediction angle of 63°. The intra-prediction mode 640 is a Zone 3 (i.e., a south-west) intra-prediction mode. An intra-prediction mode 650 illustrates the D153_PRED intra-prediction mode, which corresponds to a prediction angle of 153°. The intra-prediction mode 650 is a Zone 2 (i.e., a north-west) intra-prediction mode. An intra-prediction mode 660 illustrates the D135_PRED intra-prediction mode, which corresponds to a prediction angle of 135°. The intra-prediction mode 660 is a Zone 1 (i.e., a north-east) intra-prediction mode.

The prediction modes D45_PRED and D207_PRED (not shown) correspond, respectively, to the prediction angles 45° (Zone 1 or north-east intra-prediction mode) and 207° (Zone 3 or south-west intra-prediction mode). The DC_PRED corresponds to a prediction mode where all prediction block pixels are set to a single value that is a combination of the peripheral pixels A-M.

The PAETH_PRED intra-prediction mode is an example of a non-directional intra-prediction mode. In the PAETH_PRED intra-prediction mode, the prediction value of a pixel is determined as follows: 1) calculate a base value as a combination of some peripheral pixels, and 2) use, as the prediction pixel, the one of the some peripheral pixels that is closest to the base value. The PAETH_PRED intra-prediction mode is illustrated using, as an example, a pixel 612 (at location x=1, y=2). In an example of a combination of some peripheral pixels, the base value can be calculated as base=B+K−M. That is, the base value is equal to: the value of the left peripheral pixel that is in the same row as the pixel to be predicted+the value of the above peripheral pixel that is in the same column as the pixel−the value of the pixel in the top-left corner.

Figure 7:
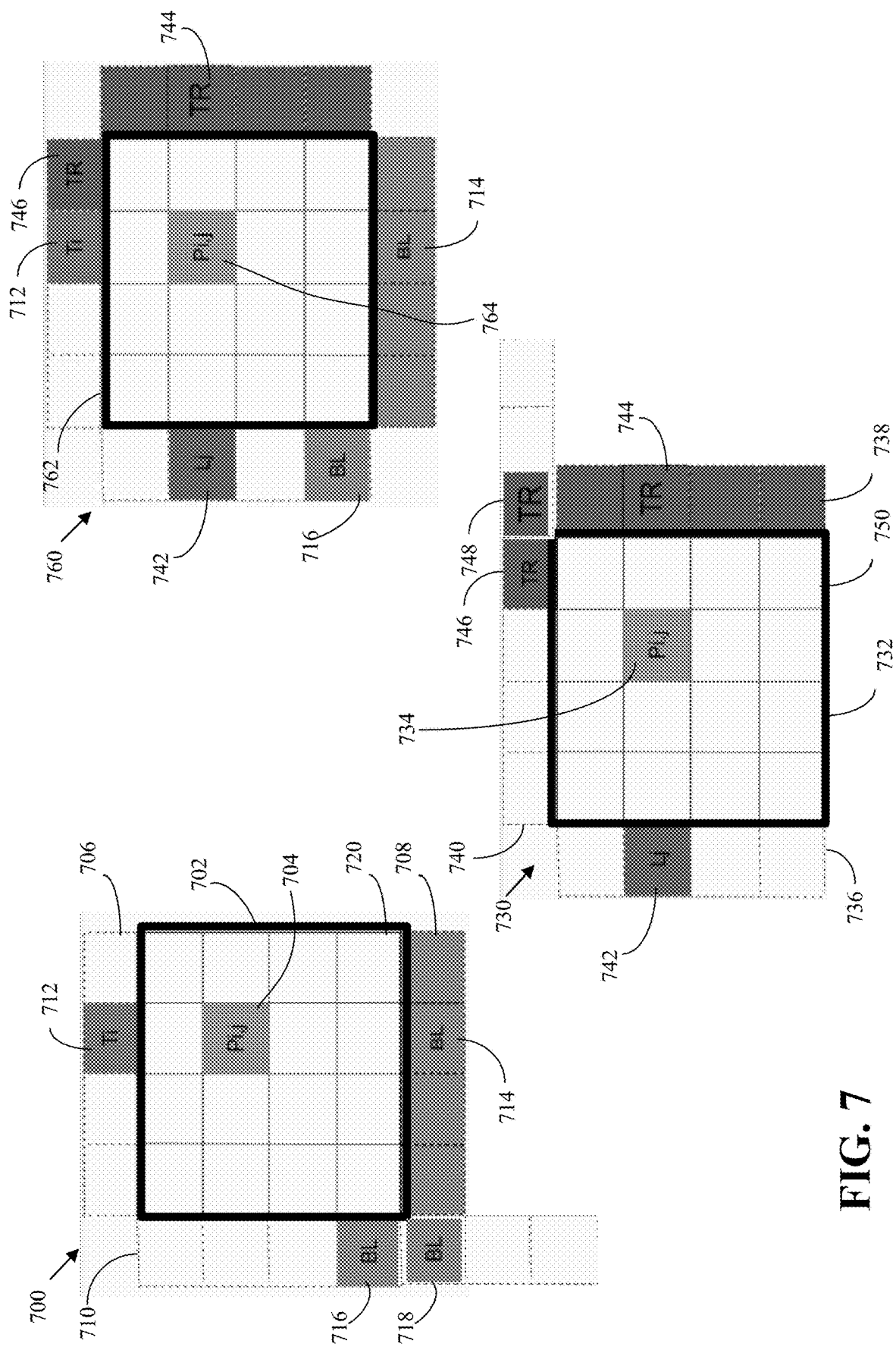
FIG. 7 is a diagram of examples of smooth intra-prediction modes according to implementations of this disclosure.

FIG. 7 is a diagram of examples of smooth intra-prediction modes according to implementations of this disclosure. In FIG. 7, an intra-prediction mode 700 illustrates the SMOOTH_V_PRED intra-prediction mode, an intra-prediction mode 730 illustrates the SMOOTH_H_PRED intra-prediction mode, and an intra-prediction mode 760 illustrates the SMOOTH_PRED intra-prediction mode.

The description herein refers to "neighboring pixels" (e.g., "first neighboring pixels" and "second neighboring pixels") and "pixels" (e.g., "second pixels" and "fourth pixels"). A "pixel" is understood to be at a location and to have a value. For simplicity, instead of, for example, using "neighboring pixels at a location" and "neighboring pixel values," only "neighboring pixel" may be used. The context should make clear whether a location or a value is being referred to. Additionally, a "pixel value" can also mean a luminance value (i.e., a Y value) or a chrominance value (e.g., a U or a V value). As such, selecting, generating, calculating, or the like, a pixel value encompasses selecting, generating, or calculating a luminance pixel value; selecting, generating, or calculating a chrominance U pixel value; or selecting, generating, or calculating a chrominance V pixel value.

The SMOOTH_V_PRED intra-prediction mode (or, simply, prediction mode) can be summarized as follows. Using available reconstructed pixels along a first (e.g., top or bottom) horizontal edge of a current block, generate one or more pixel values along the opposite horizontal edge (e.g., bottom or top), and interpolate pixels of the first edge and the opposite edge to determine the pixel values of the prediction block. The one or more pixel values along the opposite horizontal edge can be generated using available reconstructed pixels peripheral to a vertical (e.g., left or right) edge of the current block. If reconstructed pixels peripheral to a vertical edge are not available, such as when the current block is at the edge of a frame, then a default value (e.g., 128) can be used instead of reconstructed pixels.

The SMOOTH_H_PRED intra-prediction mode can be summarized as follows. Using available reconstructed pixels along a first (e.g., right or left) vertical edge of a current block, generate one or more pixel values along the opposite vertical edge (e.g., left or right), and interpolate pixels of the first edge and the opposite edge to determine the pixel values of the prediction block. The one or more pixel values along the opposite vertical edge can be generated using available reconstructed pixels peripheral to a horizontal (e.g., top or bottom) edge of the current block. If reconstructed pixels peripheral to a horizontal edge are not available, such as when the current block is at the edge of a frame, then a default value (e.g., 128) can be used instead of reconstructed pixels.

The SMOOTH_PRED intra-prediction mode combines the operations of the SMOOTH_V_PRED and SMOOTH_H_PRED prediction modes. That is, for example, for a pixel of the prediction block, a first interpolation value can be determined as described with respect to the SMOOTH_V_PRED, a second interpolation value can be determined as described with respect to the SMOOTH_H_PRED, and the first interpolation value and the second interpolation value can be combined (e.g., averaged, added and scaled, etc.) to set the corresponding pixel of the prediction block.

As used in this disclosure, "determine" means to create, form, produce, select, construct, identify, specify, calculate, generate, or otherwise determine in any manner whatsoever. As used in this disclosure, "generate" means to create, form, produce, select, construct, identify, specify, calculate, determine, or otherwise generate in any manner whatsoever.

Illustrated with respect to the SMOOTH_V_PRED intra-prediction mode (i.e., the intra-prediction mode 700) are a prediction block 702, first neighboring pixels 706, second pixels 708, and third neighboring pixels 710. The prediction block 702 is the prediction block to be generated. The prediction block is coextensive with (i.e., has the same size as) a current block being predicted.

The first neighboring pixels 706 can be as described with respect to the first pixels 608 of FIG. 6A or the pixels A-M of FIG. 6B. As such, the first neighboring pixels 706 are peripheral to (e.g., adjoining and outside of) the current block along a first edge of the block. The first edge is illustrated as being the top edge. However, that need not be the case: Which peripheral reconstructed pixels are available depends on the scan order of the current image that includes the current block.

The third neighboring pixels 710 can be as described with respect to the second pixels 605 of FIG. 6A or the pixels I-M of FIG. 6B. As such, the third neighboring pixels 710 are peripheral to (i.e., adjoining and outside of) the current block along a third edge of the block. The third edge is illustrated as being the left edge. However, that need not be the case: Which peripheral reconstructed pixels are available depends on the scan order of the current image that includes the current block.

At least one of the pixels of the third neighboring pixels 710 can be used to generate the second pixels 708. It is noted that the second pixels 708 are not available pixels. That is, the second pixels 708 are not reconstructed pixels. The second pixels 708 are calculated pixels. The second pixels 708 are calculated using pixels of the third neighboring pixels 710. That is, the pixels of the second pixels 708 (e.g., a row) are calculated from the adjoining and reconstructed third neighboring pixels (e.g., a column). Much like the first neighboring pixels 706 are peripheral to the current block, the second pixels 708 are also thought of as being peripheral to the current block. The second pixels 708 are peripheral along an edge that is parallel to the edge to which the first neighboring pixels 706 are peripheral. That is, for example, if the first neighboring pixels 706 are peripheral to the top edge, then the second pixels 708 are thought of (e.g., considered to be) peripheral to the bottom edge.

In an example, each pixel, such as a pixel 714, of the second pixels 708 is set to the value of a reconstructed pixel 716 of the third neighboring pixels 710. The reconstructed pixel 716 is the reconstructed pixel that is aligned with the last row of the current block (or, equivalently, the prediction block). For example, if the current block (or, equivalently, the prediction block 702) is of size M×N (e.g., 4×4, where M=4), then the reconstructed pixel 716 is the fourth reconstructed pixel of the third neighboring pixels 710. That is, the reconstructed pixel 716 can be as illustrated with respect to the pixel L of the intra-prediction modes 610-660.

In an example, the third neighboring pixels 710 can have more available pixels than shown in FIG. 6B. For example, the second pixels 605 of FIG. 6A show that more reconstructed pixels are available. As such, instead of using the reconstructed pixel 716, a reconstructed pixel 718, adjoining the second pixels 708 (i.e., adjoining the assumed location for the second pixels 708), can be used to generate the values of the second pixels 708.

In an example, even if the reconstructed pixel 718 is available, the second pixels 708 can be generated using the reconstructed pixel 716. In another example, a combination of any of the third neighboring pixels 710 can be used to set the values of the second pixels 708.

As described above, the pixels of the second pixels 708 can be set to the pixel value of one of the reconstructed pixels 716, 718 (i.e., a pixel value of BL). As such, each of the pixels of the second pixels 708 can have the same value, BL. As such, the second pixels 708 can mean one pixel value (i.e., BL). In another example, each pixel of the second pixels 708 can have a different value. For example, a value of a pixel of the second pixels 708 can be calculated based on the BL value and the distance of the pixel from the edge.

The first neighboring pixels 706 and the second pixels 708 can be used to determine the pixel values of the prediction block 702. Each pixel 704 of the prediction block 702 can be calculated as an interpolation of a corresponding pixel of the first neighboring pixels 706 and a corresponding pixel of the second pixels 708. It is noted that since one value (i.e., BL) can be used for all pixels of the second pixels 708, the second pixels 708 can be only one pixel (i.e., one pixel value).

Each pixel $P_{i,j}$ (i.e., a pixel in row i) of the prediction block 702 can be calculated as a scaled weighted sum of a pixel $T_i$ (e.g., a pixel 712 of the first neighboring pixels 706) that is in the same column j as the pixel $P_{i,j}$ and a corresponding pixel of the second pixels 708 (e.g., the value BL). The weights can depend on the distance of the pixel $P_{i,j}$ from the top and bottom edges of the prediction block 702.

In an example, a linear interpolation is used. As such, the weights of the interpolation, which may be values between 0 and 1, can be evenly distributed. That is, for example, given a block of size M×N, where M is the number of rows, then the weights can be proportional to M. That is, a row X is assigned a weight (X+1)/M, where X=0, 1, . . . , N−1. For example, for a 4×4 block, where M=4, the weights are 0.25, 0.5, 0.75, and 1. However, other weights can be used.

Other interpolation techniques can also be used. For example, the interpolation can be a cosine of 0 to 90 degrees interpolation, a cosine of 0 to 180 degrees interpolation, an exponential interpolation, a cubic interpolation, a quadratic below linear, a quadratic above linear, or a quadratic interpolation.

In an example, a quadratic interpolation (in this case, a quadratic interpolation in the vertical direction) can be used. For example, the square of the interpolation weights can be distributed between 0 and 1.

To summarize, the SMOOTH_V_PRED mode can work as follows:
1) Estimate the bottom row pixels to be the same as a combination of the left reconstructed pixels (the combination of the left reconstructed pixels can simply be the bottom-left pixel (BL)); and
2) Estimate the pixels ($P_{i,j}$) within the prediction block using an interpolation (e.g., a quadratic interpolation in the vertical direction) between the top row and the bottom row (i.e., the estimated or assumed row).

The following VerticalSmoothPredictorBlock function is an example of an implementation that can be used by a codec to generate the prediction block using the quadratic interpolation in the vertical direction.

--- function VerticalSmoothPredictorBlock(rows, cols, left_col, top_row, top_left, pred)

1. below_pred = left_col[rows − 1]
2. vert_weights = GetWeights(rows)
3. sm_weight_log2_scale = 8
4. scale = (1 << sm_weight_log2_scale);
5. for row in 0 to rows − 1, repeat:
6.   for col in 0 to cols − 1, repeat:
7.     total = top_row[col] * vert_weights[row] + below_pred * (scale − vert_weights[row])
8.     pred[row][col] = Clip(total / scale)

---

The function VerticalSmoothPredictorBlock receives, as input, rows (i.e., the number of rows in the prediction block), cols (i.e., the number of columns in the prediction block), left_col (i.e., an array of the left reconstructed pixels, such as the third neighboring pixels 710 of FIG. 7 or the second pixels 605 of FIG. 6A), top row (i.e., an array of the top reconstructed pixels, such as the first pixels 608 of FIG. 6 or the first neighboring pixels 706 of FIG. 7), and top_left (i.e., the top-left pixel reconstructed pixel value, such as the pixel M of FIG. 6). The function VerticalSmoothPredictorBlock generates, as output, pred (i.e., the prediction block to be generated).

At operation 1, the value below_pred (i.e., the second pixels 708) is set to the last value of the left neighboring reconstructed pixels (i.e., the reconstructed pixel 716). However, as indicated above, the below pred can be set to any combination of the third neighboring pixels 710. Also, as indicated, the below pred can be set (e.g., an array) to the reconstructed pixel 718. The variable vert_weights is assigned, at operation 2, to a pointer into a weights lookup table. The weights are used for the quadratic interpolation. The interpolation weights are looked up in a weights table (via a call to the function GetWeights), as further described with respect to FIG. 8.

Interpolation coefficients (i.e., weights) are typically values between 0 and 1. However, as performing integer arithmetic is more efficient, the weights are scaled to integer values. A scaling factor of 8 is used to correspond to the pixel values to be generated for the prediction block. In the example of the above pseudo-code, generated pixel values are to be values between 0 and 255 (i.e., $2^8-1$), as such a variable, sm_weight_log 2_scale, to be used as a scaling factor, is set to 8 at operation 3. Correspondingly, a scaling factor, scale, is used as the maximum interpolation weight. The value of scale is set at operation 4 to "1 left-shifted by 8 bits," providing a value of 256. Similarly, the result of the interpolation is scaled, at operation 8, to a value between 0 and 255 using the variable scale—the function Clip( ) clips a value to a range of 0 and 255 (both inclusive).

For each of the prediction pixels of the prediction block pred, such as a pixel at a row row and column col, a total value is calculated at operation 7. The total value corresponds to the weighted sum of the reconstructed pixel in the same column col (i.e., top_row[col]) and the below pred value (i.e., the value BL, as described above).

Figure 8:
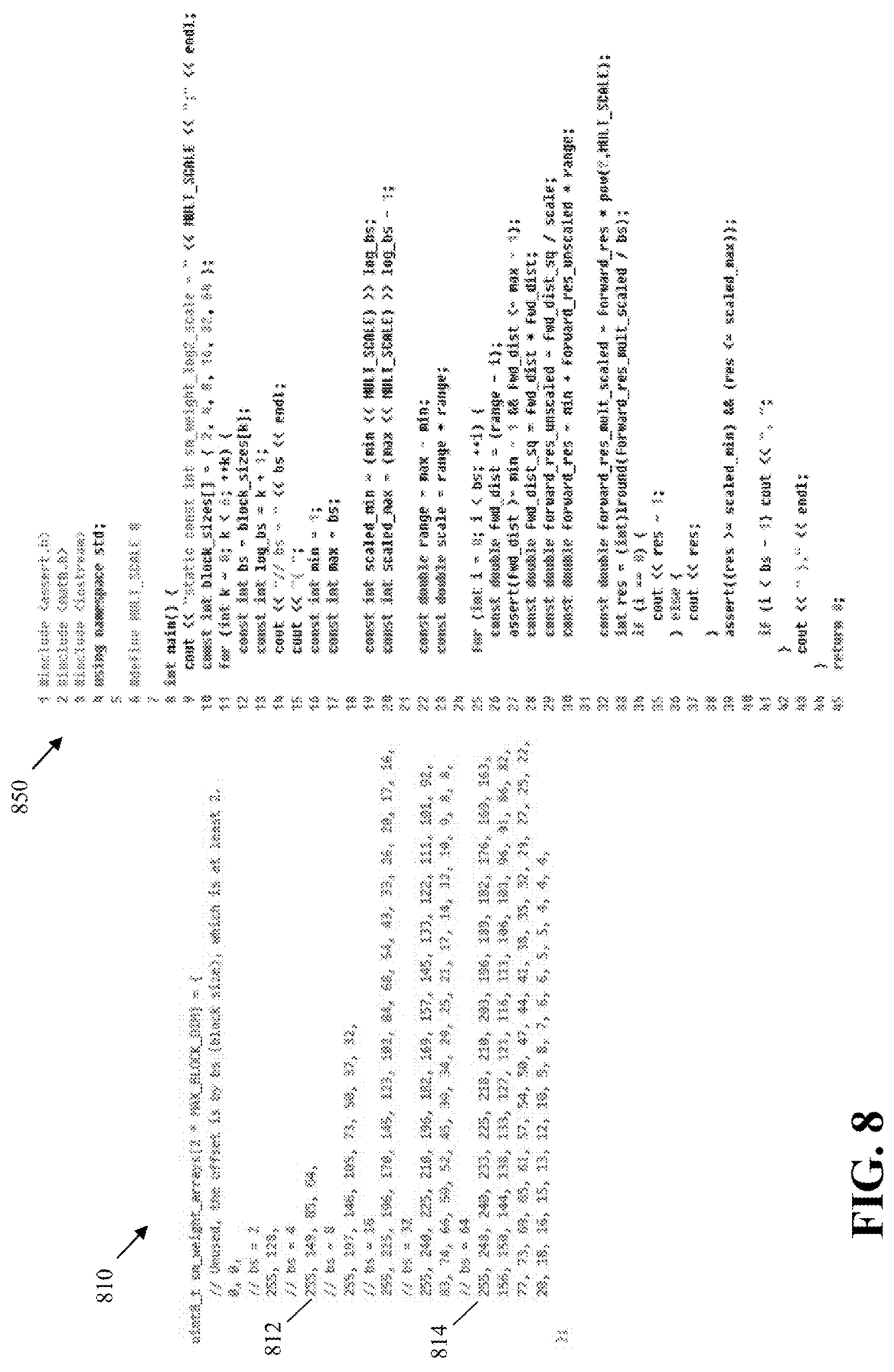

FIG. 8 is an example of weights used for a quadratic interpolation according to implementations of this disclosure. FIG. 8 includes a weights table 810, sm_weights_arrays. The weights table 810 is illustrated as a one-dimensional array; however, the weights table can be implemented using other data structures.

As described with respect to FIG. 7, the GetWeights function is used to return an index into the weights table 810. The GetWeights function receives, as input, a block size, and returns the location (i.e., a pointer to the location) of the weights to be used with each row of the block. The following is an example of an implementation of the GetWeights function:

function GetWeights(dim)
1. return sm_weight_arrays+dim

The weights table 810 is shown to include weights for blocks of a maximum of 64 rows or columns. However, the disclosure is not so limited. The weights table 810 can include weights for larger dimensions.

In an example of the operation of the GetWeights function, if a block dimension of 4 is input to the GetWeights function, then the GetWeights function returns a pointer to (i.e., the index of) a weight 812. As such, the weights 255, 149, 85, and 64 are used, respectively, at operation 8 of the VerticalSmoothPredictorBlock function, for the values of the iteration variable col, namely, col=0, 1, 2, and 3. Similarly, if a block dimension of 64 is input to the GetWeights function, then the GetWeights function returns a pointer to (i.e., the index of) a weight 814.

In an implementation, instead of looking up the weights in the weights table 810, the weights can be calculated when required. A program 850 is an example of generating at least part of the weights table 810. As such, instead of pre-generating the weights table 810 and using the weights table 810 as a lookup table, a person skilled in the art can appreciate that the program 850, or similar programs and functions, can be used instead of the weights table 810.

Illustrated with respect to the SMOOTH_H_PRED intra-prediction mode (i.e., the intra-prediction mode 730) are a prediction block 732, first neighboring pixels 736, second pixels 738, and third neighboring pixels 740. The prediction block 732 is the prediction block to be generated. The prediction block is coextensive with (i.e., has the same size as) a current block being predicted.

The first neighboring pixels 736 can be as described with respect to the second pixels 605 of FIG. 6A or the pixels I-M of FIG. 6B. As such, the first neighboring pixels 736 are peripheral to (e.g., adjoining and outside of) the current block along a first edge of the block. The first edge is illustrated as being the left edge. However, that need not be the case: Which peripheral reconstructed pixels are available depends on the scan order of the current image that includes the current block.

The third neighboring pixels 740 can be as described with respect to the first pixels 608 of FIG. 6A or the pixels A-H of FIG. 6B. As such, the third neighboring pixels 740 are peripheral to (i.e., adjoining and outside of) the current block along a third edge of the block. The third edge is illustrated as being the top edge. However, that need not be the case: Which peripheral reconstructed pixels are available depends on the scan order of the current image that includes the current block.

At least one of the pixels of the third neighboring pixels 740 can be used to generate the second pixels 738. It is noted that the second pixels 738 are not available pixels. That is, the second pixels 738 are not reconstructed pixels. The second pixels 708 are calculated pixels. The second pixels 738 are calculated using pixels of the third neighboring pixels 740. That is, the pixels of the second pixels 738 (e.g., a column) are calculated from the adjoining and reconstructed third neighboring pixels (e.g., a row). Much like the first neighboring pixels 736 are peripheral to the current block, the second pixels 738 are also thought of as being peripheral to the current block. The second pixels 738 are peripheral along an edge that is parallel to the edge to which the first neighboring pixels 736 are peripheral. That is, for example, if the first neighboring pixels 736 are peripheral to the left edge, then the second pixels 738 are thought of (e.g., considered to be) peripheral to the right edge.

In an example, each pixel, such as a pixel 744, of the second pixels 738 is set to the value of a reconstructed pixel 746 of the third neighboring pixels 740. The reconstructed pixel 746 is the reconstructed pixel that is aligned with the last column of the current block (or, equivalently, the prediction block). For example, if the current block (or, equivalently, the prediction block 732) is of size M×N (e.g., 4×4, where N=4), then the reconstructed pixel 746 is the fourth reconstructed pixel of the third neighboring pixels 740. That is, the reconstructed pixel 746 can be as illustrated with respect to the pixel D of the intra-prediction modes 610-660.

In an example, instead of using the reconstructed pixel 746, a reconstructed pixel 748, adjoining the second pixels 738 (i.e., adjoining the assumed location for the second pixels 738), can be used to generate the values of the second pixels 738.

As described above, the pixels of the second pixels 738 can be set to the pixel value of one of the reconstructed pixels 746, 748 (i.e., a pixel value of TR). As such, each of the pixels of the second pixels 738 can have the same value, TR. As such, the second pixels 738 can mean one pixel value (i.e., RL).

The first neighboring pixels 736 and the second pixels 738 can be used to determine the pixel values of the prediction block 732. Each pixel 734 of the prediction block 732 can be calculated as an interpolation of a corresponding pixel of the first neighboring pixels 736 and a corresponding pixel of the second pixels 738. It is noted that in the case where one value (i.e., TR) is used for all pixels of the second pixels 738, the second pixels 738 can be only one pixel (i.e., one pixel value).

Each pixel $P_{i,j}$ (i.e., a pixel in column j) of the prediction block 732 can be calculated as a scaled weighted sum (i.e., an interpolation) of a pixel $L_j$ (e.g., a pixel 742 of the first neighboring pixels 736) that is in the same row as the pixel $P_{i,j}$ and a corresponding pixel of the second pixels 738 (e.g., the value TR). The weights can depend on the distance of the pixel $P_{i,j}$ from the left and right edges of the prediction block 732.

To summarize, the SMOOTH_H_PRED mode can work as follows:
1) Estimate the right column pixels to be the same as a combination of the top reconstructed pixels (the combination can simply be the top-right pixel (TR)); and
2) Estimate the pixels (Pi,j) within the prediction block using an interpolation (e.g., a quadratic interpolation in the horizontal direction) between the left column and the right column (i.e., the estimated row).

The SMOOTH_H_PRED intra-prediction mode can use one of the interpolation techniques described with respect to the SMOOTH_V_PRED described above.

In an example, the following HorizontalSmoothPredictorBlock function is an example of an implementation that can be used by a codec to generate the prediction block using a quadratic interpolation in the horizontal direction. The function HorizontalSmoothPredictorBlock is similar in many respects to the function VerticalSmoothPredictorBlock described above. As such, a description of the function HorizontalSmoothPredictorBlock is omitted.

| function HorizontalSmoothPredictorBlock(rows, cols, left_col, top_row, top_left, pred) |
| --- |
| 1. right_pred = top[cols − 1] |
| 2. hor_weights = GetWeights(cols) |
| 3. sm_weight_log2_scale = 8 |
| 4. scale = (1 << sm_weight_log2_scale); |
| 5. for row in 0 to rows − 1, repeat: |
| 6.     for col in 0 to cols − 1, repeat: |
| 7.         total = left[row] * hor_weights[col] + right_pred * (scale − hor_weights[col]) |
| 8.         pred[row][col] = Clip(total / scale) |

Illustrated with respect to the SMOOTH_PRED intra-prediction mode (i.e., the intra-prediction mode 760) are a prediction block 762 and a prediction pixel 764. The intra-prediction mode 760 also includes the pixel 712, the pixel 714, and the reconstructed pixels 716, which are as described with respect to the intra-prediction mode 700; and the pixel 742, the pixel 744, and reconstructed pixels 746, which are as described with respect to the intra-prediction mode 730.

SMOOTH_PRED combines the operations of the SMOOTH_V_PRED and the SMOOTH_H_PRED intra-prediction modes. That is, for example, for the prediction pixel 764 of the prediction block, a first interpolation value is determined using the pixel 742 and the pixel 744, a second interpolation value is determined using the pixel 712 and the pixel 714, and the first interpolation value and the second interpolation value can be combined (e.g., averaged, scaled, etc.).

To summarize, the SMOOTH_PRED mode can work as follows:
1. Perform a vertical interpolation by:
   a. Estimating the bottom row pixels to be the same as a bottom-left pixel (e.g., BL); and
   b. Calculating a vertical interpolation value (Vi,j) within the block using a vertical interpolation (e.g., a quadratic interpolation in the vertical direction) between the top row and the bottom row.
2. Perform a horizontal interpolation by:
   a. Estimating the right column pixels to be the same as a top-right pixel (e.g., TR); and
   b. Calculating a horizontal interpolation value (Hi,j) within the block using a horizontal interpolation (e.g., a quadratic interpolation in the horizontal direction) between the left row and the right column.
3. Calculate final prediction pixel values by:
   a. Calculating each pixel Pi,j as the average of Vi,j and Hi,j.

The following SmoothPredictorBlock function is an example of an implementation that can be used by a codec to generate the prediction block using the quadratic interpolation in both the vertical direction and the horizontal direction. The function SmoothPredictorBlock is similar to the VerticalSmoothPredictorBlock and HorizontalSmoothPredictorBlock functions. As such, a description of the function SmoothPredictorBlock is omitted.

```
function SmoothPredictorBlock(rows, cols, left_col,
                              top_row, top_left, pred)
1. below_pred = left[rows − 1]
2. right_pred = top[cols − 1]
3. hor_weights = GetWeights(cols)
4. vert_weights = GetWeights(rows)
5. sm_weight_log2_scale = 8
6. scale = (1 << sm_weight_log2_scale);
7. for row in 0 to rows−1, repeat:
8.     for col in 0 to cols − 1, repeat:
9.         total = above[col]*vert_weights[row] +
                   below_pred*(scale − vert_weights[row]) +
                   left[row] * hor_weights[col] +
                   right_pred * (scale − hor_weights[col])
10.        pred[row][col] = Clip(total / (scale*2))
```

At operation 9, each of the sub-expressions "above [col] *vert_weights [row]+below_pred*(scale−vert_weights [row])" and "left[row] *hor_weights[col]+right_pred* (scale−hor_weights [col])" produces a value that is in the scale of scale (e.g., 256). As such, the total is in the scale of scale*2 (e.g., 512). As such, at operation 10, the total value is divided by (scale*2).

The intra-prediction mode selected by the encoder can be transmitted to a decoder in the bitstream. The intra-prediction mode can be entropy coded (encoded by the encoder and/or decoded by a decoder) using a context model.

Some codecs use the intra-prediction modes of the left and above neighbor blocks as the context for coding the intra-prediction mode of a current block. Using FIG. 6 as an example, the left neighbor block can be the block containing the pixels I-L, and the above neighbor block can be the block containing the pixels A-D.

A codec can include a probability distribution for each combination of intra-prediction modes used by the left neighbor block and above neighbor block. As such, using the above 13 prediction modes, 169 probability distributions (corresponding to 13*13=172 contexts) may be stored. To retrieve a probability distribution, the codec can perform a procedure that includes the operations:

```
cdf_prob kf_y_mode_cdf[13][13][13];
left = left neighbor intra mode (or DC_PRED if unavailable)
above = above neighbor intra mode (or DC_PRED if
   unavailable)
prob_table = kf_y_mode_cdf[left][above];
```

For ease of reference, the above procedure is referred to as the ctx-combinations technique. In the ctx-combinations technique, left stores the intra-prediction mode of the left neighbor block. If the intra-prediction mode of the left neighbor block is not available, then the DC_PRED intra-prediction mode may be assumed. above stores the intra-prediction mode of the top neighbor block. If the intra-prediction mode of the above neighbor block is not available, then the DC_PRED intra-prediction mode may be assumed.

An intra-prediction mode may not be available because, for example, the current block is at the edge (e.g., is the topmost and/or leftmost block) of the frame or because the neighbor block (left or above) was inter-predicted. The intra-prediction mode may not be available for other reasons. The probability distribution (i.e., prob_table) can be retrieved from a three-dimensional array (i.e., kf_y_mode_cdf) that includes the probability distributions for all combinations of left and above intra-prediction modes. In an example, the first dimension corresponds to the left neighbor intra-prediction mode (e.g., 13 values), the second dimension corresponds to the above neighbor intra-prediction mode (e.g., 13 values), and the third dimension corresponds to the values of a probability distribution.

As indicated above, each probability distribution includes 13 probability values (i.e., a probability value for each of the prediction modes). As such, there are 12 freedoms (i.e., only 12 of the 13 probability values are stored per context). In some implementations, a 13th entry that is a constant (e.g., a 0) may also be stored.

The number of stored probability distributions and/or probability values per probability distribution can be reduced by reducing the number of contexts for coding an intra-prediction mode.

In an example, the number of contexts can be reduced when some of the intra-prediction modes exhibit certain characteristics. For example, the probabilities of some of the intra-prediction modes may not significantly change based on the left intra-prediction mode and/or the above intra-prediction mode. Such intra-prediction modes may be equally probable regardless of the left and above intra-prediction modes. In an example, the SMOOTH_PRED, SMOOTH_V_PRED, and SMOOTH_H_PRED prediction modes may exhibit such characteristics.

Implementations according to this disclosure can reduce the number of contexts available for coding the intra-prediction mode of a current block using a procedure that includes the operations:

```
1. cdf_prob kf_y_mode_cdf[13][2][13];
2. left = left neighbor intra mode (or DC_PRED if unavailable)
```

-continued

```
3. above = above neighbor intra mode (or DC_PRED if unavailable)
4. if (left == above)
    a. prob_table = kf_y_mode_cdf[left][0];
5. else if (left != SMOOTH_PRED && left != SMOOTH_H_PRED &&
        left != SMOOTH_V_PRED)
    a. prob_table = kf_y_mode_cdf[left][1];
6. else
    a. prob_table = kf_y_mode_cdf[above][1];
```

For ease of reference, the above procedure is referred to as the first-ctx-reduction technique. Using the first-ctx-reduction technique, the number of contexts can be reduced to 26. As such, the number of contexts used to code (encode/decode) the intra-prediction modes of luminance blocks can be reduced by approximately 85%. In the operations 4-4a above, if the left neighbor block and the above neighbor block use the same intra-prediction mode, then the left intra-prediction mode is used to retrieve a probability distribution. This accounts for 13 probability distributions. The operations 5-6 can be summarized as: If one of the left or above neighbors uses a smooth prediction mode (i.e., one of SMOOTH_PRED, SMOOTH_V_PRED, or SMOOTH_H_PRED), then retrieve a probability distribution using the other intra-prediction mode. These operations account for another 13 probability distributions.

In an implementation, the operations can be used to determine the context for coding the intra-prediction modes of blocks of a key frame (also known as a golden frame). In a key frame, all blocks are predicted using intra-prediction.

Figure 9:
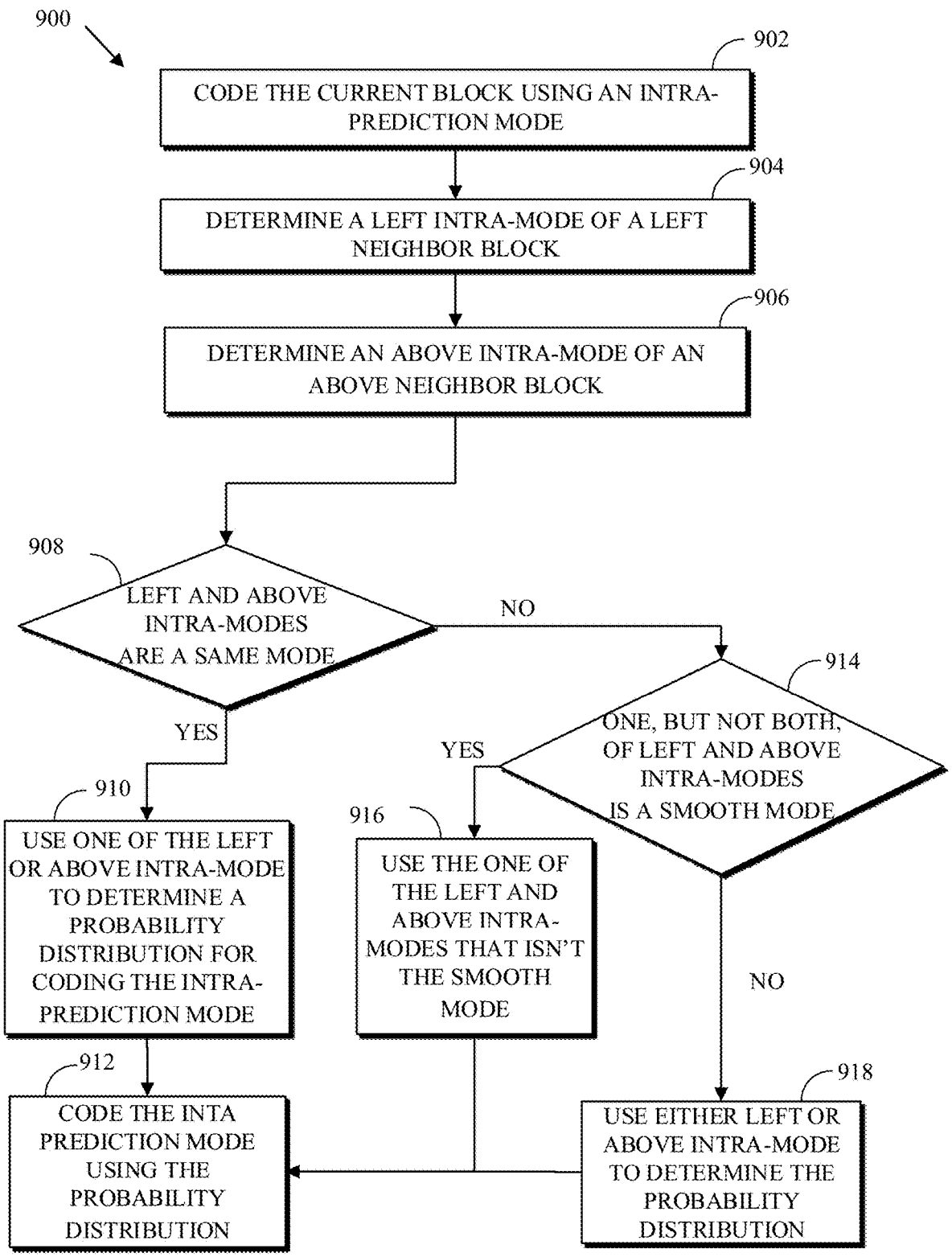
FIG. 9 is a flowchart diagram of a process for intra-coding a current block according to an implementation of this disclosure.

FIG. 9 is a flowchart diagram of a process 900 for intra-coding a current block according to an implementation of this disclosure. The process 900 can be implemented by an encoder, such as the encoder 400 of FIG. 4. When implemented by an encoder, "coding" means encoding in an encoded bitstream, such as the compressed bitstream 420 of FIG. 4. For example, the process 900 can be performed in whole or in part by the entropy encoding stage 408 of the encoder 400. The process 900 can be performed by a decoder, such as the decoder 500 of FIG. 5. When implemented by a decoder, "coding" means decoding from an encoded bitstream, such as the compressed bitstream 420 of FIG. 5. For example, the process 900 can be performed in whole or in part by the entropy decoding stage 502 of the decoder 500, and the encoded video bitstream can be the compressed bitstream 420 of FIG. 5.

Implementations of the process 900 can be performed by storing instructions in a memory, such as the memory 204 of the receiving station 106, to be executed by a processor, such as the CPU 202, for example.

The process 900 can be implemented using specialized hardware or firmware. Some computing devices can have multiple memories, multiple processors, or both. The steps or operations of the process 900 can be distributed using different processors, memories, or both. For simplicity of explanation, the process 900 is depicted and described as a series of steps or operations. However, the teachings in accordance with this disclosure can occur in various orders and/or concurrently. Additionally, operations in accordance with this disclosure may occur with other operations not presented and described herein. Furthermore, not all illustrated steps or operations may be used to implement a method in accordance with the disclosed subject matter.

At 902, the process 900 codes the current block using an intra-prediction mode. At 904, the process 900 determines a left intra-mode (i.e., an intra-prediction mode) of a left neighbor block. In an implementation, if the left intra-mode is not available, then the left intra-mode can be assumed to be a default left intra-prediction mode. The default left intra-prediction mode can be one of the available intra-prediction modes. For example, the default left intra-prediction mode can be the DC_PRED mode.

At 906, the process 900 determines an above intra-mode (i.e., an intra-prediction mode) of an above neighbor block. In an implementation, if the above intra-mode is not available, then the above intra-mode can be assumed to be a default above intra-prediction mode. The default above intra-prediction mode can be one of the available intra-prediction modes. For example, the default above intra-prediction mode can be the DC_PRED mode.

At 908, if the left intra-mode and the above intra-mode are the same, then the process 900 proceeds to 910; otherwise, the process 900 proceeds to 914. At 910, the process 900 uses one of the left intra-mode or the above intra-mode (which are the same) to determine a probability distribution for coding the intra-prediction mode. As such, on condition that the left intra-mode and the above intra-mode are equal to a same mode, the process 900 uses that same mode to determine a probability distribution for coding the intra-prediction mode. As used in this disclosure, "determine" means to select, construct, identify, specify, generate, or otherwise determine in any manner whatsoever. For example, the probability distribution can be retrieved from a memory.

Some of the available intra-prediction modes can be classified as smooth intra-prediction modes. In an implementation, the smooth intra-prediction mode can be one of SMOOTH_PRED, SMOOTH_H_PRED, and SMOOTH_V_PRED. On condition that at least one of the left intra-mode or the above intra-mode is the smooth intra-prediction mode, the process 900 uses the other of the left intra-mode and the above intra-mode to determine the probability distribution for coding the intra-prediction mode. Accordingly, at 914, the process 900 determines if one, but not both, of the left intra-mode and the above intra-mode is the smooth intra-prediction mode. If so, the process 900 proceeds to 916 and uses the one of the left intra-mode and the above intra-mode that isn't the smooth intra-prediction mode to determine the probability distribution for coding the intra-prediction mode; otherwise, the process 900 proceeds to 918 to use either one of the left intra-mode or the above intra-mode to determine the probability distribution. In an implementation, the left intra-prediction mode is used at 918. From 916 or 918, the process 900 proceeds to 912. At 912, the process 900 codes the intra-prediction mode using the probability distribution.

The number of contexts for coding the intra-prediction mode of a current block can be reduced by splitting the available intra-prediction modes into classes. Each class can include one or more intra-prediction modes. The number of symbols coded for an intra-prediction mode can depend on the class of the intra-prediction mode.

In an example, the 13 intra-prediction modes described above can be split into classes as shown in Table II.

TABLE II

| Intra-Prediction Mode | Intra-Prediction Class |
| --- | --- |
| DC_PRED | DC |
| H_PRED | H |
| V_PRED | V |
| SMOOTH_PRED, SMOOTH_V_PRED, and SMOOTH_H_PRED | SMOOTH |

TABLE II-continued

| Intra-Prediction Mode | Intra-Prediction Class |
|---|---|
| PAETH_PRED | PAETH |
| D45_PRED, D135_PRED, D117_PRED, D153_PRED, D207_PRED, D63_PRED | DIRECTIONAL |

A first symbol can indicate the intra-prediction class of the intra-prediction mode. As there are six (6) intra-prediction classes in Table II, using the ctx-combinations technique for determining a probability distribution for coding the first symbol, a total of 36 contexts are possible. The 36 contexts correspond to six (6) possible classes for the left neighbor block and six (6) possible classes for the above neighbor block. Each of the contexts includes five (5) probability values. Using the first-ctx-reduction technique, only 12 (=6*2) contexts are required to code the first symbol.

If the intra-prediction mode is in the class SMOOTH, then, using the ctx-combinations technique for determining a probability distribution for coding a second symbol, a total of nine (9) contexts are possible. The nine (9) contexts correspond to three (3) possible smooth intra-prediction modes for the left neighbor block and three (3) possible smooth intra-prediction modes for the above neighbor block. Using the first-ctx-reduction technique, only one (1) context is required. Each context includes two (2) probability values. The SMOOTH class can include the intra-prediction modes that are smooth intra-prediction modes, as described above. Said another way, each of the smooth intra-prediction modes can be mapped to the SMOOTH class.

If the intra-prediction mode is in the class DIRECTIONAL, then, using the ctx-combinations technique for determining a probability distribution for coding the second symbol, a total of 36 contexts are possible. The 36 contexts correspond to six (6) possible intra-prediction modes in the DIRECTIONAL class for the left neighbor block and six (6) possible intra-prediction modes in the DIRECTIONAL class for the above neighbor block. Using the first-ctx-reduction technique, only 12 contexts are required. Each context provides five (5) probability values. The DIRECTIONAL class can include the intra-prediction modes that are directional intra-prediction modes, as described above. Said another way, each of the directional intra-prediction modes can be mapped to the DIRECTIONAL class.

Figure 10:
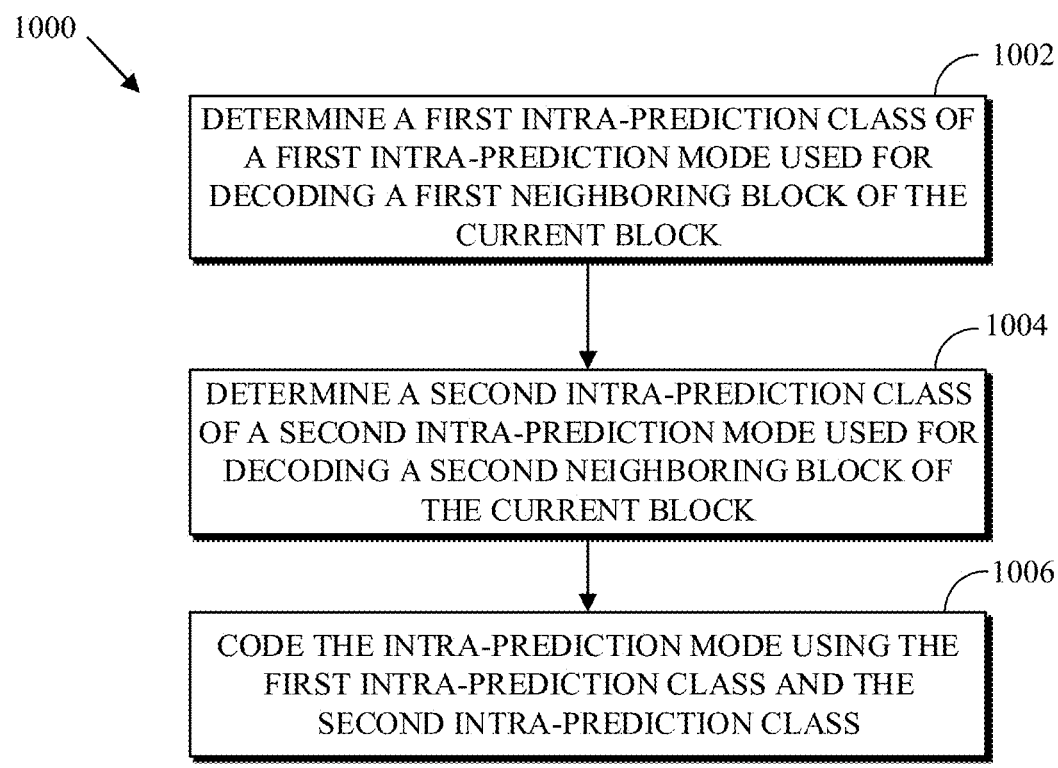
FIG. 10 is a flowchart diagram of a process for coding a current block using an intra-prediction mode according to an implementation of this disclosure.

FIG. 10 is a flowchart diagram of a process 1000 for coding a current block using an intra-prediction mode according to an implementation of this disclosure. In coding the current block using intra-prediction, an encoder can encode the intra-prediction mode used to encode the current block into an encoded bitstream (such as the compressed bitstream 420 of FIG. 4). In decoding the current block using intra-prediction, a decoder can decode the intra-prediction mode to be used to decode the current block from an encoded bitstream (such as the compressed bitstream 420 of FIG. 5).

The process 1000 can code one (and in some cases more than one) symbol in/from the compressed bitstream indicating the intra-prediction mode. The process 1000 codes a first symbol using a context model. The context used (for the selection of the context model) can be, or can include, as described above, the intra-prediction modes of neighboring coded blocks of the current block. The process 1000 maps the intra-prediction modes of the neighboring blocks to classes, wherein the number of classes is smaller than the number of available intra-prediction modes. The process 1000 uses the classes of the intra-prediction modes of the neighboring blocks, instead of the intra-prediction modes themselves, to select the context model. Implementations of the process 1000 can reduce the number of contexts used for coding the intra-prediction mode.

The process 1000 can be performed by a decoder, such as the decoder 500 of FIG. 5. For example, the process 1000 can be performed in whole or in part by the entropy decoding stage 502 of the decoder 500, and the encoded video bitstream can be the compressed bitstream 420 of FIG. 5. The process 1000 can be implemented by an encoder, such as the encoder 400 of FIG. 4. For example, the process 1000 can be performed in whole or in part by the entropy encoding stage 408 of the decoder 500. Implementations of the process 1000 can be performed by storing instructions in a memory, such as the memory 204 of the receiving station 106, to be executed by a processor, such as the CPU 202, for example. The process 1000 can be implemented using specialized hardware or firmware. Some computing devices can have multiple memories, multiple processors, or both. The steps or operations of the process 1000 can be distributed using different processors, memories, or both. For simplicity of explanation, the process 1000 is depicted and described as a series of steps or operations.

At 1002, the process 1000 determines a first intra-prediction class of a first intra-prediction mode used for decoding a first neighboring block of the current block. At 1004, the process 1000 determines a second intra-prediction class of a second intra-prediction mode used for decoding a second neighboring block of the current block. The first neighboring block and the second neighboring block can be, respectively, the above and left neighboring blocks of the current block, or vice versa. Referring to FIG. 6B as an example, and where the frame containing the current block is processed in a raster scan order, the above block can be the block that contains some of the pixels A-H, and the left block can be the block that contains some of the pixels I-L.

The first intra-prediction mode and the second intra-prediction mode are selected from a list of available intra-prediction modes. In an implementation, the first intra-prediction mode and the second intra-prediction mode are each selected from a set that includes the above-described DC_PRED, V_PRED, H_PRED, D45_PRED, D135_PRED, D117_PRED, D153_PRED, D207_PRED, D63_PRED, SMOOTH_PRED, SMOOTH_V_PRED, SMOOTH_H_PRED, and PAETH_PRED intra-prediction modes. More, fewer, or other intra-prediction modes may be available.

The process 1000 can determine the first intra-prediction class and the second intra-prediction class using a mapping that maps intra-prediction modes to classes. In an implementation, a mapping, such as the one described with respect to Table II, can be used. As such, the first intra-prediction class and the second intra-prediction class are each selected from a set that includes the above-described DC class, horizontal class (i.e., H class), vertical class (i.e., V class), a smooth class (i.e., SMOOTH class), a paeth class (i.e., PAETH class), and a directional class (i.e., DIRECTIONAL class). However, other mappings may be available.

Table II maps the 13 available intra-prediction modes to six classes. The directional class can include the D45_PRED, D135_PRED, D117_PRED, D153_PRED, D207_PRED, and D63_PRED intra-prediction modes. The smooth class can include the SMOOTH_PRED, SMOOTH_V_PRED, and SMOOTH_H_PRED intra-prediction modes.

At 1006, the process 1000 codes the intra-prediction mode using the first intra-prediction class and the second intra-prediction class.

In an implementation, coding the intra-prediction mode using the first intra-prediction class and the second intra-prediction class can include coding a first symbol indicative of a class of the intra-prediction mode and, on condition that the intra-prediction mode is one of a smooth intra-prediction mode or a directional intra-prediction mode, coding a second symbol indicative of the intra-prediction mode.

The first symbol can be a symbol of an alphabet, such that each of the symbols of the alphabet is indicative of one of the intra-prediction classes. As such, one symbol is indicative of the DC class, a second symbol is indicative of the horizontal class, a third symbol is indicative of the vertical class, and so on.

When implemented by an encoder, the process 1000 can determine that the intra-prediction mode used to code the current block is a smooth intra-prediction mode by determining that the intra-prediction mode is one of the SMOOTH_PRED, SMOOTH_V_PRED, and SMOOTH_H_PRED intra-prediction modes. Alternatively, the process 1000 can determine that the intra-prediction mode is a smooth intra-prediction mode if the class of the intra-prediction mode is the smooth class. Similarly, the process 1000 can determine that the intra-prediction mode is a directional intra-prediction mode by determining that the intra-prediction mode is one of the D45_PRED, D135_PRED, D 117_PRED, D153_PRED, D207_PRED, and D63_PRED intra-prediction modes. Alternatively, the process 1000 can determine that the intra-prediction mode is a directional intra-prediction mode if the class of the intra-prediction mode is the directional class. Alternatively, the process 1000 can determine that the intra-prediction mode is one of a smooth intra-prediction mode or a directional intra-prediction mode by using the first symbol.

When implemented by a decoder, the process 1000 can determine that the intra-prediction mode is one of a smooth intra-prediction mode or a directional intra-prediction mode by using the first symbol. That is, after decoding the first symbol, the process 1000 can use the first symbol to determine whether the intra-prediction mode is one of a smooth intra-prediction mode or a directional intra-prediction mode.

In an implementation, only one context model is available for coding any of the smooth intra-prediction modes. As such, if the intra-prediction mode is a smooth intra-prediction mode, the process 1000 selects the single available context model for coding the second symbol. When implemented by a decoder, the process 1000 can determine that the intra-prediction mode is a smooth intra-prediction mode by using the first symbol to determine the class of the intra-prediction mode. In another implementation, more than one context model can be available for coding a smooth intra-prediction mode. As such, the process 1000 codes another symbol in order to select a context model.

In an implementation, only two context models are available for coding a directional intra-prediction mode: a first context model and a second context model. As such, coding the second symbol indicative of the intra-prediction mode can include a condition that when the intra-prediction mode is a directional intra-prediction mode, if the first intra-prediction class and the second intra-prediction class are a same class (i.e., are equal), the process 1000 selects the first context model for coding the second symbol; and if the first intra-prediction class and the second intra-prediction class are different classes (i.e., are not equal), the process 1000 selects the second context model for coding the second symbol.

Figure 11:
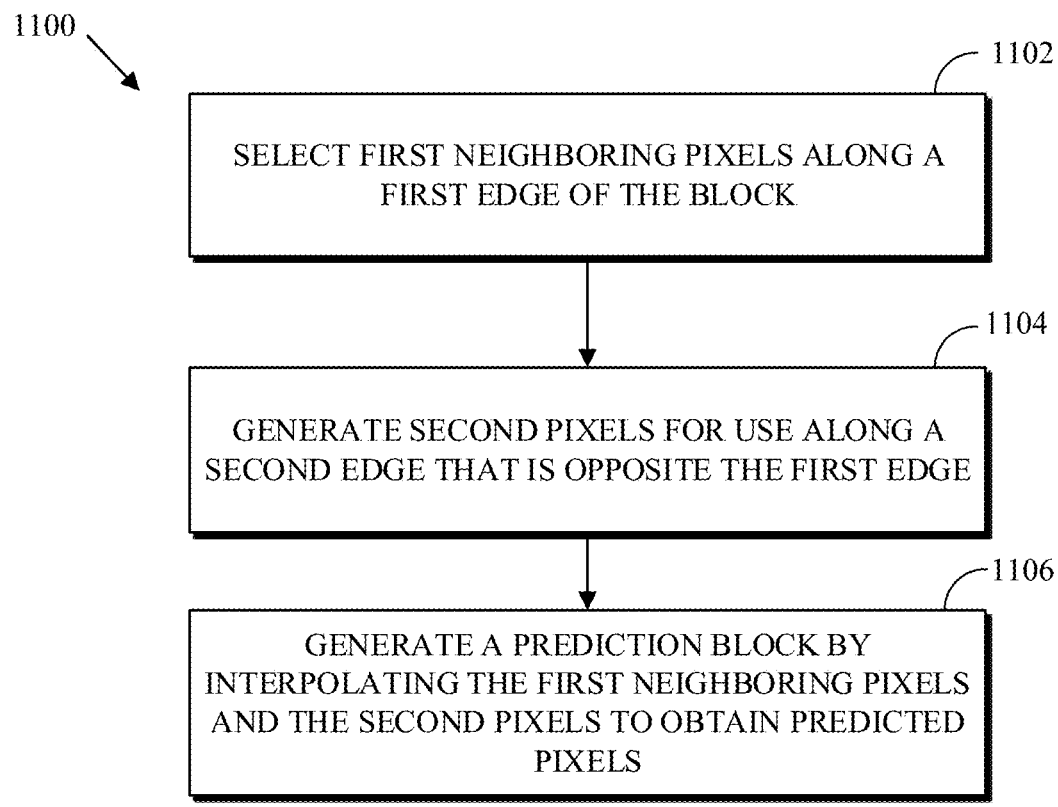
FIG. 11 is a flowchart diagram of a process for coding a block of a video frame using an intra-prediction mode according to an implementation of this disclosure.

FIG. 11 is a flowchart diagram of a process 1100 for coding a block of a video frame using an intra-prediction mode according to an implementation of this disclosure. The block of the video frame can be a block of a still image. The intra-prediction mode can be one of the SMOOTH_PRED, the SMOOTH_H_PRED, or the SMOOTH_V_PRED intra-prediction modes described above.

The process 1100 can be implemented by an encoder, such as the encoder 400 of FIG. 4. When implemented by an encoder, "coding" means encoding in an encoded bitstream, such as the compressed bitstream 420 of FIG. 4. For example, the process 1100 can be performed in whole or in part by the intra/inter-prediction stage 402 of the encoder 400. The process 1100 can be performed by a decoder, such as the decoder 500 of FIG. 5. When implemented by a decoder, "coding" means decoding from an encoded bitstream, such as the compressed bitstream 420 of FIG. 5. For example, the process 1100 can be performed in whole or in part by the intra/inter-prediction stage 508 of the decoder 500, and the encoded video bitstream can be the compressed bitstream 420 of FIG. 5.

Implementations of the process 1100 can be performed by storing instructions in a memory, such as the memory 204 of the receiving station 106, to be executed by a processor, such as the CPU 202, for example.

The process 1100 can be implemented using specialized hardware or firmware. Some computing devices can have multiple memories, multiple processors, or both. The steps or operations of the process 1100 can be distributed using different processors, memories, or both. For simplicity of explanation, the process 1100 is depicted and described as a series of steps or operations. However, the teachings in accordance with this disclosure can occur in various orders and/or concurrently. Additionally, operations in accordance with this disclosure may occur with other operations not presented and described herein. Furthermore, not all illustrated steps or operations may be used to implement a method in accordance with the disclosed subject matter.

At 1102, the process 1100 selects first neighboring pixels. The first neighboring pixels are peripheral to the block along a first edge of the block. For example, when the intra-prediction mode is the SMOOTH_V_PRED mode, the first neighboring pixels can be as described with respect to the first neighboring pixels 706 of FIG. 7. For example, when the intra-prediction mode is the SMOOTH_H_PRED mode, the first neighboring pixels can be as described with respect to the first neighboring pixels 736 of FIG. 7. For example, when the intra-prediction mode is the SMOOTH_PRED mode, the first neighboring pixels can be as described with respect to the first neighboring pixels 706 or the first neighboring pixels 736 of FIG. 7.

At 1104, the process 1100 generates second pixels for use along a second edge that is opposite the first edge of the block. "Generate" as used herein can mean calculate, determine, select, or otherwise generate in any manner possible. The second pixels are generated using third neighboring pixels. The third neighboring pixels are peripheral to a third edge of the block, which is different from the first edge and the second edge.

In an example, if the intra-prediction mode is the SMOOTH_V_PRED mode, the second pixels can be as described with respect to the second pixels 708 of FIG. 7, and the third neighboring pixels can be as described with respect to the third neighboring pixels 710 of FIG. 7.

In an example, if the intra-prediction mode is the SMOOTH_H_PRED mode, the second pixels can be as described with respect to the second pixels 738 of FIG. 7, and the third neighboring pixels can be as described with respect to the third neighboring pixels 740 of FIG. 7.

In an example, if the intra-prediction mode is the SMOOTH_PRED mode, the second pixels can be as described with respect to the second pixels 708 or the second pixels 738 of FIG. 7, and the third neighboring pixels can be as described with respect to the third neighboring pixels 710 or the third neighboring pixels 740 of FIG. 7.

At 1106, the process 1100 generates a prediction block that includes predicted pixels. Each of the predicted pixels can be generated by interpolating the first neighboring pixels and the second pixels to obtain the predicted pixels. The process 1100 uses a first interpolation method.

In an example, the process 1100 uses a quadratic interpolation (i.e., the first interpolation method). The quadratic interpolation can be as described with respect to FIG. 7. In an example, the process 1100 can include looking up coefficients for the quadratic interpolation in a weights table. The weights table can be as described with respect to the weights table 810 of FIG. 8.

In an example, and in the case where the intra-prediction mode is the SMOOTH_PRED mode, the process 1100 can include generating fourth pixels for use along a fourth edge that is opposite the third edge of the block. For example, if the second pixels are as described with respect to the pixel 714, then the fourth pixels are as described with respect to the pixel 744, and vice versa. As such, the process 1100 can also include interpolating, using a second interpolation method, the third neighboring pixels and the fourth pixels to obtain the predicted pixels. In an example, the second interpolation method can be the same as the first interpolation method (e.g., a quadratic interpolation). In another example, the first interpolation method and the second interpolation method can be different. For example, the first interpolation method can be a linear interpolation, and the second interpolation method can be a quadratic interpolation; or the first interpolation method can be a quadratic interpolation, and the second interpolation method can be a linear interpolation. Other combinations of the first interpolation method and the second interpolation method are possible.

In an implementation, the prediction block can include the second pixels. For example, in the case of the SMOOTH_V_PRED intra-prediction mode, the last row of the prediction block can be set to the second pixels. That is, instead of determining the pixel values of the last row of the prediction block by interpolation, the pixels of the last row are set to the second pixels. For example, a row 720 of FIG. 7 can be set to the pixel 714. As such, if the prediction block includes N rows, then only the pixels of the first N−1 rows are generated by interpolation. Accordingly, the prediction block can include the fourth pixels.

Similarly, in the case of the SMOOTH_H_PRED intra-prediction mode, the last column of the prediction block can be set to the second pixels. That is, instead of determining the pixel values of the last column of the prediction block by interpolation, the pixels of the last column are set to the second pixels. For example, a column 750 of FIG. 7 can be set to the pixel 744. As such, if the prediction block includes M columns, then only the pixels of the first M−1 rows are generated by interpolation.

Similarly, in the case of the SMOOTH_PRED intra-prediction mode, the prediction block can include at least one of the second pixels and the fourth pixels.

In an implementation, the last column of the prediction block can be set to the fourth pixels. That is, instead of determining the pixel values of the last row of the prediction block by interpolation, the pixels of the last row are set to the second pixels. For example, a row 720 of FIG. 7 can be set to the pixel 714. As such, if the prediction block includes N rows, then only the pixels of the first N−1 rows are generated by interpolation. Accordingly, the prediction block can include the fourth pixels.

When implemented by an encoder, the process 1100 can include generating a residual block using the prediction block and the block of video, and encoding the residual block in a compressed bitstream, such as the compressed bitstream 420 of FIG. 4. The residual block can be generated as described with respect to the intra/inter-prediction stage 402 to produce a residual block of FIG. 4. The residual block can be encoded in the compressed bitstream as described with respect to at least one of the transform stage 404, the quantization stage 406, and the entropy encoding stage 408 of the encoder 400. As such, a transform type is selected in the encoding of the residual block.

In some examples, the transform type selected by the encoder can depend on the intra-prediction mode. The transform types available can include an ADST_ADST transform type, a DCT_ADST transform type, and an ADST_DCT transform type. The ADST_ADST, DCT_ADST, and ADST_DCT transform types are 2-dimensional transform types. The ADST_ADST transform type applies an ADST transform to the rows of a transform block followed by another ADST transform to the columns. The DCT_ADST transform type applies a DCT transform to the rows of a transform block followed by another ADST transform to the columns. The ADST_DCT transform type applies an ADST transform to the rows of a transform block followed by a DCT transform to the columns.

In an example, in a case where the intra-prediction mode is the SMOOTH_PRED intra-prediction mode, the transform type can be the ADST_ADST transform type. In an example, in a case where the intra-prediction mode is the SMOOTH_H_PRED intra-prediction mode, the transform type can be the DCT_ADST transform type. In an example, in a case where the intra-prediction mode is the SMOOTH_V_PRED intra-prediction mode, the transform type can be the ADST_DCT transform type.

When implemented by a decoder, the process 1100 can include decoding a residual block, and reconstructing the block using the residual block and the prediction block. The residual block can be decoded as described with respect to at least one of the dequantization stage 504 and the inverse transform stage 506 of the decoder 500. As such, a transform type can be used to decode the residual block. More specifically, the inverse of the transform is used to decode transform blocks.

In an example, the transform type selected can depend on the intra-prediction mode. For example, in a case where the intra-prediction mode is the SMOOTH_PRED intra-prediction mode, the transform type can be the ADST_ADST transform type, which inverse transforms the rows of a transform block with the ADST transform and the columns of the transform block with the ADST transform. For example, in a case where the intra-prediction mode is the SMOOTH_H_PRED intra-prediction mode, the transform type can be the DCT_ADST transform type, which inverse transforms the rows of a transform block with the ADST transform and the columns of the transform block with the DCT transform. For example, in a case where the intra-prediction mode is the SMOOTH_V_PRED intra-prediction mode, the transform type can be the ADST_DCT transform type, which inverse transforms the rows of a transform block with the DCT transform and the columns of the transform block with the ADST transform.

For simplicity of explanation, the processes 900, 1000, and 1100 are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some encoding and decoding techniques. However, it is to be understood that "encoding" and "decoding," as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as being preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise or clearly indicated otherwise by the context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special-purpose computer/processor, which can contain other hardware for carrying out any of the methods, algorithms, or instructions described herein, can be utilized.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other transmitting station 102 and receiving station 106 implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for coding a block of a video frame using an intra-prediction mode, comprising:
    selecting first neighboring pixels, the first neighboring pixels being peripheral to the block along a first edge of the block;
    generating second pixels for use along a second edge that is opposite the first edge of the block, wherein
        the second pixels are generated using third neighboring pixels,
        the third neighboring pixels being peripheral to a third edge of the block, and the third edge being different from the first edge and the second edge;

generating a prediction block comprising predicted pixels by interpolating, using a first interpolation, the first neighboring pixels and the second pixels to obtain the predicted pixels; and
    coding the intra-prediction mode, wherein the intra-prediction mode is selected from a first set comprising SMOOTH_PRED, SMOOTH_V _PRED, and SMOOTH_H_PRED;
    generating a transform block for a residual block;

selecting a transform type for coding the residual block from a second set comprising a DCT_ADST transform type, an ADST_DCT transform type, and an ADST_ADST transform type, wherein
    in a first case where the intra-prediction mode is the SMOOTH_PRED, the transform type is the ADST_ADST transform type,
    in a second case where the intra-prediction mode is the SMOOTH_H_PRED, the transform type is the DC_TADST transform type, and
    in a third case where the intra-prediction mode is the SMOOTH_V_PRED, the transform type is the ADST_DCT transform type; and
coding the transform block using the transform type.

2. The method of claim 1, wherein the first interpolation is a quadratic interpolation.

3. The method of claim 2, wherein interpolating, using the first interpolation, the first neighboring pixels and the second pixels comprises:
    looking up coefficients for the quadratic interpolation in a weights table.

4. The method of claim 1, further comprising:
    generating fourth pixels for use along a fourth edge that is opposite the third edge of the block,
        wherein the fourth pixels are generated using the first neighboring pixels,
        wherein generating the prediction block further comprises:
    interpolating, using a second interpolation, the third neighboring pixels and the fourth pixels to obtain the predicted pixels.

5. The method of claim 4, wherein the prediction block comprises the fourth pixels.

6. The method of claim 1, wherein the prediction block comprises the second pixels.

7. An apparatus for encoding a block of a video frame using an intra-prediction mode, comprising:
    a memory; and
    a processor, wherein the processor is configured to execute instructions stored in the memory to:
        select first neighboring pixels, the first neighboring pixels being peripheral to the block along a first edge of the block;
        generate second pixels for use along a second edge that is opposite the first edge of the block, wherein
            the second pixels are generated using third neighboring pixels,
            the third neighboring pixels being peripheral to a third edge of the block, and
            the third edge being different from the first edge and the second edge;
        generate a prediction block comprising predicted pixels by executing instructions to=interpolate, using an interpolation, the first neighboring pixels and the second pixels to obtain the predicted pixels;
        generate a residual block using the prediction block and the block of video;
        encode the intra-prediction mode, the intra-prediction mode selected from a first set comprising a first intra-prediction mode, a second intra-prediction mode, and a third intra-prediction mode; and
        encode the residual block in a compressed bitstream by instructions to:
            select a transform type for coding the residual block from a second set comprising a DCT_ADST transform type, an ADST_DCT transform type, and an ADST_ADST transform type, wherein
                in a first case where the intra-prediction mode is the first intra-prediction mode, the transform type is the ADST_ADST transform type,
                in a second case where the intra-prediction mode is the second intra-prediction mode, the transform type is the ADST _DCT transform type, and
                in a third case where the intra-prediction mode is the third intra-prediction mode, the transform type is the DCT_ADST transform type.

8. The apparatus of claim 7, wherein the interpolation is a quadratic interpolation.

9. The apparatus of claim 8, wherein to interpolate, using the interpolation, the first neighboring pixels and the second pixels comprises:
    looking up coefficients for the quadratic interpolation in a weights table.

10. The apparatus of claim 7, wherein the instructions further comprise instructions to:
    generate fourth pixels for use along a fourth edge that is opposite the third edge of the block, wherein the fourth pixels are generated using the first neighboring pixels,
    wherein to generate the prediction block further comprises:
        interpolating, using the interpolation, the third neighboring pixels and the fourth pixels to obtain the predicted pixels.

11. The apparatus of claim 10, wherein the prediction block comprises the fourth pixels.

12. The apparatus of claim 7, wherein the prediction block comprises the second pixels.

13. An apparatus for decoding a block of a video frame using an intra-prediction mode, comprising:
    a memory; and
    a processor, wherein the processor is configured to execute instructions stored in the memory to:
        select first neighboring pixels, the first neighboring pixels being peripheral to the block along a first edge of the block;
        generate second pixels for use along a second edge that is opposite the first edge of the block, wherein
            the second pixels are generated using third neighboring pixels,
            the third neighboring pixels being peripheral to a third edge of the block, and
            the third edge being different from the first edge and the second edge;
        generate a prediction block comprising predicted pixels by executing instructions to
            interpolate, using an interpolation, the first neighboring pixels and the second pixels to obtain the predicted pixels;
        decode, from a compressed bitstream, the intra-prediction mode, the intra-prediction mode being one of a first intra-prediction mode, a second intra-prediction mode, and a third intra-prediction mode;
        decode, from the compressed bitstream, a residual block by instructions to:
            select a transform type for decoding the residual block from a second set comprising a DCT_ADST transform type, an ADST_DCT transform type, and an ADST_ADST transform type, wherein
                in a first case where the intra-prediction mode is the first intra-prediction mode, the transform type is the ADST_ADST transform type, in a second case where the intra-prediction mode is the second intra-prediction mode, the transform type is the ADST_DCT transform type, and in a third case where the intra-prediction mode is the third intra-prediction mode, the transform type is the DCT_ADST transform type; and reconstruct the block using the residual block and the prediction block.

14. The apparatus of claim 13, wherein the interpolation is a quadratic interpolation.

15. The apparatus of claim 14, wherein to interpolate, using the interpolation, the first neighboring pixels and the second pixels comprises:

looking up coefficients for the quadratic interpolation in a weights table.

16. The apparatus of claim 13, wherein the instructions further comprise instructions to:

generate fourth pixels for use along a fourth edge that is opposite the third edge of the block,
wherein the fourth pixels are generated using the first neighboring pixels,
wherein to generate the prediction block further comprises:
interpolating, using the interpolation, the third neighboring pixels and the fourth pixels to obtain the predicted pixels.

17. The apparatus of claim 16, wherein the prediction block comprises the fourth pixels.

* * * * *